US010742650B2

(12) United States Patent
Sakamoto et al.

(10) Patent No.: US 10,742,650 B2
(45) Date of Patent: Aug. 11, 2020

(54) COMMUNICATION SYSTEM AND COMPUTER READABLE STORAGE MEDIUM

(71) Applicant: e-Jan Networks Co., Tokyo (JP)

(72) Inventors: Shiro Sakamoto, Kanagawa (JP); Kumar Karvepaku, Andhra Pradesh (IN); Daisuke Yanagisawa, Kanagawa (JP); Shinji Kusuki, Kanagawa (JP)

(73) Assignee: e-Jan Networks Co., Tokyo (JP)

( * ) Notice: Subject to any disclaimer, the term of this patent is extended or adjusted under 35 U.S.C. 154(b) by 239 days.

(21) Appl. No.: 15/856,067

(22) Filed: Dec. 28, 2017

(65) Prior Publication Data
US 2018/0124050 A1 May 3, 2018

Related U.S. Application Data

(63) Continuation of application No. PCT/JP2016/065779, filed on May 27, 2016.

(30) Foreign Application Priority Data

Jul. 1, 2015 (JP) ................................. 2015-133052

(51) Int. Cl.
H04L 29/06 (2006.01)
G06F 21/31 (2013.01)
(Continued)

(52) U.S. Cl.
CPC .......... H04L 63/0876 (2013.01); G06F 13/00 (2013.01); G06F 21/31 (2013.01);
(Continued)

(58) Field of Classification Search
CPC ........ G06F 21/445; G06F 21/42; G06F 13/00; G06F 21/31; H04L 63/0876;
(Continued)

(56) References Cited

U.S. PATENT DOCUMENTS 6,037,934 A    3/2000 Himmel et al.
8,065,417 B1 * 11/2011 Richardson ...... H04N 21/26241
                                                        709/226
(Continued)

FOREIGN PATENT DOCUMENTS

JP    2014134886 A    7/2014
JP    2015046110       3/2015

OTHER PUBLICATIONS

International Search Report for International Patent Application No. PCT/JP20161065779, issued by the Japan Patent Office dated Jul. 12, 2016.

(Continued)

Primary Examiner — Saleh Najjar
Assistant Examiner — Feliciano S Mejia

(57) ABSTRACT

A communication system is provided, the communication system including:
an authenticating unit that authenticates a plurality of communication terminals based on a single user ID, and keeps the plurality of communication terminals logged into an information providing service;
a storing unit that stores therein provider registration information including a plurality of pieces of provider information that indicate providers of respective pieces of data being displayed on each communication terminal among the plurality of communication terminals;
a receiving unit that receives designation information that designates the provider registration information; and
a transmitting unit that transmits each piece among the plurality of pieces of provider information to each communication terminal among the plurality of communication terminals so as to cause each communication terminal among the plurality of communication (Continued)

terminals to display data provided by a provider indicated by a plurality of pieces of provider information.

4 Claims, 18 Drawing Sheets

(51) Int. Cl.
| | |
|---|---|
| *H04M 11/00* | (2006.01) |
| *G06F 13/00* | (2006.01) |
| *H04L 29/08* | (2006.01) |
| *G06F 21/42* | (2013.01) |
| *G06F 21/44* | (2013.01) |
| *H04W 48/08* | (2009.01) |
| *H04W 60/00* | (2009.01) |
| *H04W 88/02* | (2009.01) |

(52) U.S. Cl.
CPC .......... *G06F 21/42* (2013.01); *G06F 21/445* (2013.01); *H04L 63/06* (2013.01); *H04L 63/0807* (2013.01); *H04L 67/306* (2013.01); *H04M 11/00* (2013.01); *H04W 48/08* (2013.01); *H04W 60/00* (2013.01); *H04W 88/02* (2013.01)

(58) Field of Classification Search
CPC ... H04L 63/0807; H04L 67/306; H04L 63/06; H04W 48/08; H04W 60/00; H04W 88/02
See application file for complete search history.

(56) References Cited

U.S. PATENT DOCUMENTS

| | | | | |
|---|---|---|---|---|
| 8,307,092 | B2* | 11/2012 | Svendsen | G06F 21/105 |
| | | | | 709/227 |
| 8,959,234 | B2* | 2/2015 | Lee | H04L 63/0815 |
| | | | | 709/227 |
| 9,059,982 | B2* | 6/2015 | Nishizawa | G06F 21/604 |
| 9,374,660 | B1* | 6/2016 | Tilles | H04L 67/02 |
| 9,980,131 | B2* | 5/2018 | Jin | H04W 12/0608 |
| 10,326,733 | B2* | 6/2019 | Bokare | H04L 63/00 |
| 10,505,997 | B2* | 12/2019 | Linden | H04L 67/146 |
| 2005/0091539 | A1* | 4/2005 | Wang | G06F 21/31 |
| | | | | 726/4 |
| 2005/0238033 | A1 | 10/2005 | Sakamoto et al. | |
| 2006/0185004 | A1* | 8/2006 | Song | H04L 63/0815 |
| | | | | 726/8 |
| 2011/0078234 | A1 | 3/2011 | Engel | |
| 2012/0226780 | A1 | 9/2012 | Knight et al. | |
| 2016/0212201 | A1* | 7/2016 | Munemann | H04L 67/306 |

OTHER PUBLICATIONS

ICT de Jitsugen suru Seisansei to Shiki o Takameru Atarashii Hatarakikata Workstyle Henkaku Symposium 2014 Autumn Review, Nikkei information strategy, No. 274, Dec. 29, 2014(Dec. 29, 2014), pp. 74 to 75.
Office Action issued for counterpart Japanese Application 2015-133052, issued by the Japan Patent Office dated Jul. 4, 2017.
Extended European Search Report for European Patent Application No. 16817605.5, issued by the European Patent Office dated Aug. 28, 2017.
International Preliminary Report on Patentability for International Application No. PCT/JP2016/065779, issued by the International Bureau of WIPO dated Jan. 2, 2018.

* cited by examiner

FIG. 9

| Terminal group | | Name | Provider information |
|---|---|---|---|
| Main terminal | Group terminal | | |
| AAA001 | AAA002, AAA003, AAA004 | For work | AAA001: File server 12, cloud service 52<br>AAA002: Mail server 14<br>AAA003: Web server 16<br>AAA004: Cloud service 54 |
| BBB001 | 2 terminals | For business trip | BBB001: File server 12<br>First terminal: Mail server 14, cloud service 52<br>Second terminal: Web server 16 |
| ... | ... | ... | ... |

500
502  504  506  508

COMMUNICATION SYSTEM AND COMPUTER READABLE STORAGE MEDIUM

The contents of the following Japanese and international patent application(s) are incorporated herein by reference:
 2015-133052 filed in JP on Jul. 1, 2015; and
 PCT/JP2016/065779 filed on May 27, 2016

BACKGROUND

1. Technical Field

The present invention relates to a communication system and computer readable storage medium.

2. Related Art

A communication system that makes it possible to view data within a closed network by using a communication terminal positioned in an open network has been known (please see, for example, Patent Document 1).

PRIOR ART DOCUMENT

[Patent Document]
 [Patent Document 1] Japanese Patent No. 4551218
It has been desired to enhance the convenience of utilizing data or the like located within a closed network by using a plurality of communication terminals.

SUMMARY

According to a first aspect of the present invention, a communication system is provided. The communication system may include a terminal authenticating unit that authenticates each communication terminal among a plurality of communication terminals based on a single user ID, and keeps the plurality of communication terminals logged into an information providing service. The communication system may include a registration information storing unit that stores therein provider registration information including a plurality of pieces of provider information that indicate providers of respective pieces of data being displayed on each communication terminal among the plurality of communication terminals. The communication system may include a designation information receiving unit that receives, from at least any communication terminal among the plurality of communication terminals, designation information that designates the provider registration information. The communication system may include a provider information transmitting unit that transmits each piece among the plurality of pieces of provider information to each communication terminal among the plurality of communication terminals so as to cause, upon reception of the designation information, each communication terminal among the plurality of communication terminals to display data provided by a provider indicated by a plurality of pieces of provider information included in the provider registration information.

The communication system may include a generation instruction receiving unit that receives, from at least any communication terminal among the plurality of communication terminals, an instruction to generate the provider registration information. The communication system may include a provider information acquiring unit that acquires, upon reception of the instruction to generate the provider registration information, a plurality of pieces of provider information that indicate providers of data being displayed on each communication terminal among the plurality of communication terminals. The communication system may include a registration information generating unit that generates the provider registration information including the plurality of pieces of provider information acquired by the provider information acquiring unit. The registration information generating unit may generate the provider registration information in which terminal identification information of each communication terminal among the plurality of communication terminals and each piece among a plurality of pieces of provider information that indicate providers of data being displayed on each communication terminal among the plurality of communication terminals are associated with each other. The provider information transmitting unit may transmit, to each communication terminal among the plurality of communication terminals, provider information corresponding to terminal identification information of each communication terminal among the plurality of communication terminals.

When the designation information receiving unit has received the designation information, if at least any communication terminal among a plurality of communication terminals identified by a plurality of pieces of terminal identification information associated with a plurality of pieces of provider information included in the provider registration information is not logged in, the provider information transmitting unit may transmit, to at least any of a plurality of communication terminals that are logged in, provider information corresponding to terminal identification information of the communication terminal that is not logged in. The communication system may further include an inquiry output unit that outputs inquiry information to a communication terminal that has transmitted the designation information when the designation information receiving unit has received the designation information, if at least any communication terminal among a plurality of communication terminals identified by a plurality of pieces of terminal identification information associated with a plurality of pieces of provider information included in the provider registration information is not logged in.

When the designation information receiving unit has received the designation information, so as to cause each communication terminal among a plurality of communication terminals that are among a plurality of communication terminals included in the same terminal group as a communication terminal that has transmitted the designation information and are logged in to display data provided by a provider indicated by a plurality of pieces of provider information included in the provider registration information, the provider information transmitting unit may transmit each piece among the plurality of pieces of provider information to each communication terminal among the plurality of communication terminals. If, among a plurality of communication terminals included in the same terminal group as a communication terminal that has transmitted the designation information, the number of a plurality of communication terminals that are logged in is smaller than the number of a plurality of communication terminals corresponding to the plurality of pieces of provider information included in the provider registration information, the provider information transmitting unit may transmit a plurality of pieces of provider information to at least any communication terminal among the plurality of communication terminals that are logged in.

The summary clause does not necessarily describe all necessary features of the embodiments of the present invention. The present invention may also be a sub-combination of the features described above.

BRIEF DESCRIPTION OF THE DRAWINGS

FIG. 9 schematically illustrates one example of a provider registration information table 500.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
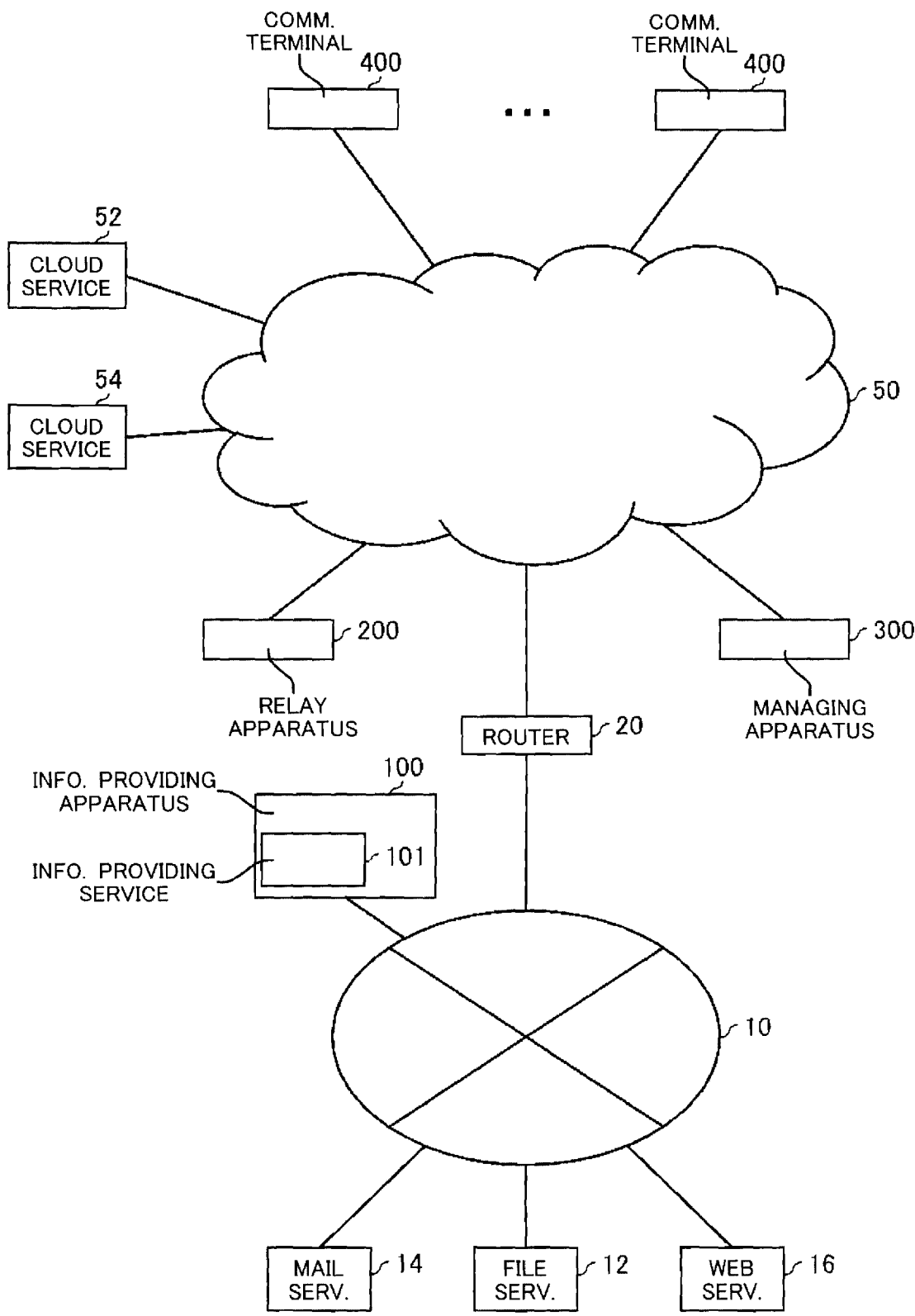
FIG. 1 schematically illustrates one example of a communication environment of an information providing apparatus 100.

FIG. 1 schematically illustrates one example of a communication environment of an information providing apparatus 100. In the present embodiment, the information providing apparatus 100 is connected to a network 10 which is a closed network. The information providing apparatus 100 supplies an information providing service 101 to provide information located within the closed network to communication terminals 400 connected to a network 50 which is an open network. The information providing apparatus 100 may be one example of a communication system.

The network 10 is, for example, an office network, and access thereto from an open network is restricted. The network 50 includes, for example, the Internet and mobile phone communication networks. The communication terminals 400 are, for example, mobile phones such as smartphones, tablet terminals, PCs (Personal Computers), etc. The network 50 may be one example of a first network. The network 10 may be one example of a second network.

In the present embodiment, a file server 12, a mail server 14 and a web server 16 are connected to the network 10. These are examples, and any application server may be connected to the network 10. For example, other than the file server 12, the mail server 14 and the web server 16, a groupware server, a web database or the like may be connected to the network 10. Electronic files managed by the file server 12, mail data managed by the mail server 14, and web data managed by the web server 16 may be examples of information provided by the information providing service 101. The file server 12, the mail server 14 and the web server 16 may be examples of data storage apparatuses.

In the present embodiment, the network 10 is connected to the network 50 via a router 20. The router 20 allows passage of connection requests from the network 10 to the network 50, but does not allow passage of connection requests from the network 50 to the network 10.

The communication terminals 400 that are registered in the information providing service 101 and positioned within the network 50 establish communication connections with the information providing apparatus 100 via a relay apparatus 200 connected to the network 50. The information providing apparatus 100 provides, via the relay apparatus 200, data managed by the file server 12, the mail server 14 and the web server 16 to the communication terminals 400 with which the information providing apparatus 100 has established communication connections. The communication terminals 400, and the file server 12, the mail server 14 and the web server 16 may perform direct communication over communication connections established by the relay apparatus 200 and the information providing apparatus 100 and between the communication terminals 400, and the file server 12, the mail server 14 and the web server 16.

The information providing service 101 supplied by the information providing apparatus 100 may provide information located within the network 50 to the communication terminals 400. For example, after communication connections are established between the information providing apparatus 100 and the communication terminals 400 via the relay apparatus 200, the information providing apparatus 100 provides, to the communication terminals 400 via the relay apparatus 200, data provided by a service positioned within the network 50. A cloud service 52 and a cloud service 54 may be examples of services positioned within the network 50. The cloud service 52 and the cloud service 54 may be SaaS (Software as a Service), PaaS (Platform as a Service), IaaS (Infrastructure as a Service), etc. The communication terminals 400, and the cloud service 52 and the cloud service 54 may perform direct communication over communication connections established by the information providing apparatus 100 and the relay apparatus 200 and between the communication terminals 400, and the cloud service 52 and the cloud service 54.

The information providing apparatus 100 according to the present embodiment may execute a token authentication function. The token authentication function may be a process of authenticating communication terminals 400 not logged into the information providing service 101 via a communication terminal 400 logged into the information providing service 101. Also, the token authentication function may be a process of authenticating communication terminals 400 not registered in the information providing service 101 via a communication terminal 400 logged into the information providing service 101. The information providing apparatus 100 may execute the token authentication function in cooperation with a managing apparatus 300 positioned within the network 50.

The information providing apparatus 100 according to the present embodiment may execute an active bookmark function. The active bookmark function may be a function of: registering provider registration information including a plurality of pieces of provider information that indicate providers of respective pieces of data being displayed by each communication terminal 400 among a plurality of communication terminals 400 registered as a terminal group; and if the provider registration information is designated, displaying, on the plurality of communication terminals 400, data provided by providers indicated by the plurality of pieces of provider information included in the provider registration information.

The information providing apparatus 100 according to the present embodiment may execute an inter-device clipboard function. The inter-device clipboard function may be a function of pasting, outside a communication terminal 400, data on which a copy operation has been performed on the communication terminal 400. The inter-device clipboard function is, for example, a function of pasting, on a communication terminal 400 among the plurality of communication terminals 400, data on which a copy operation has been performed on another communication terminal 400 among the plurality of communication terminals 400.

Figure 2:
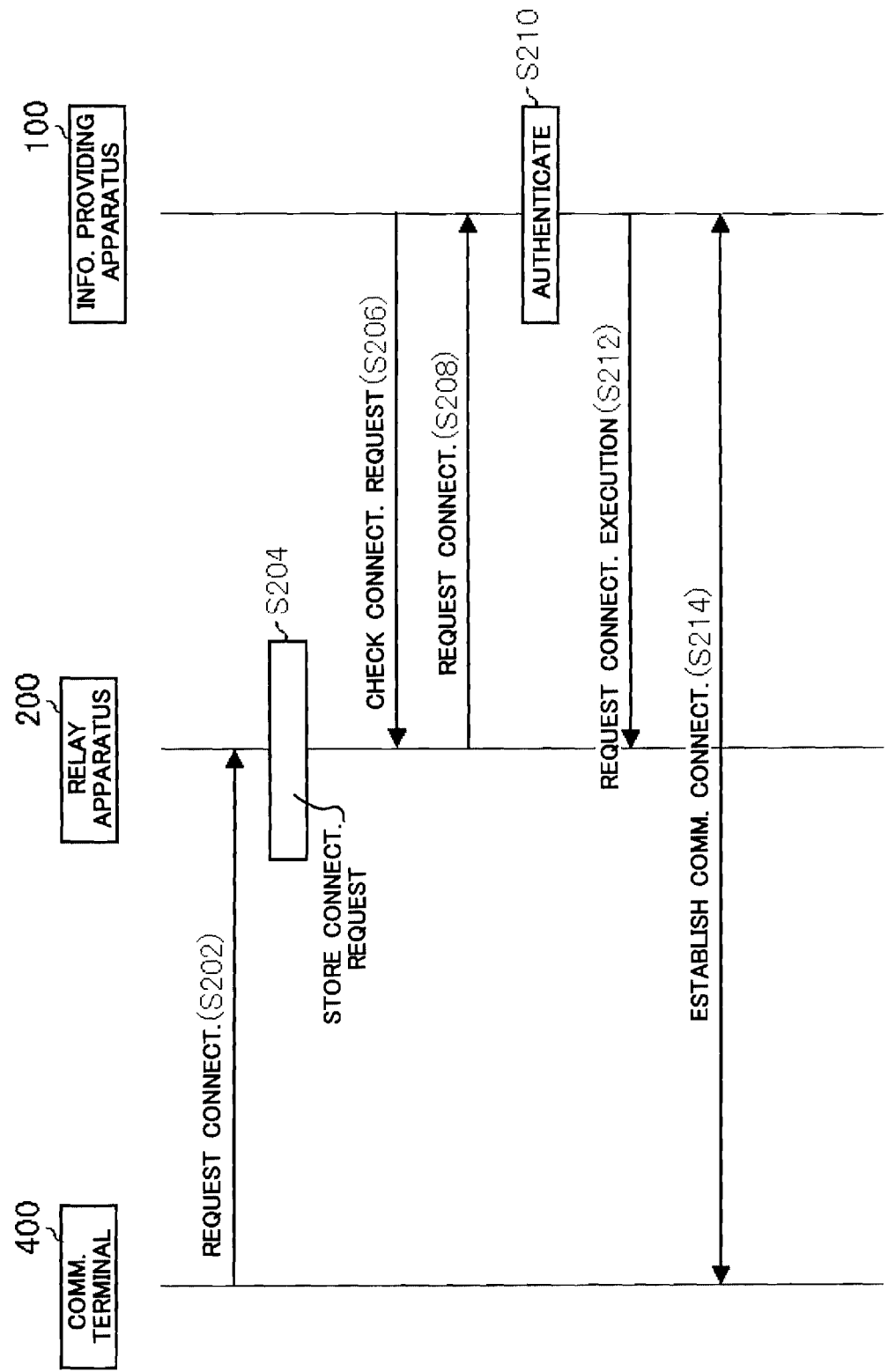
FIG. 2 schematically illustrates one example of a flow of processes performed by the information providing apparatus 100.

FIG. 2 schematically illustrates one example of a flow of processes performed by the information providing apparatus 100. FIG. 2 illustrates a flow of processes performed by the information providing apparatus 100 to establish a communication connection with a communication terminal 400 registered in the information providing service 101.

At Step (steps may be abbreviated to Ss in some cases) 202, the communication terminal 400 transmits a connection request to the relay apparatus 200. The connection request may include a user ID that identifies a user utilizing the communication terminals 400, a password, a terminal ID that identifies the communication terminal 400, and an information providing apparatus ID that identifies the information providing apparatus 100. At S204, the relay apparatus 200 stores therein the connection request received.

At S206, the information providing apparatus 100 checks with the relay apparatus 200 whether or not a request for connection with the information providing apparatus 100 is stored in the relay apparatus 200. The information providing apparatus 100 may execute the checking of a connection request intermittently. For example, the information providing apparatus 100 executes the checking of a connection request every second.

At S208, the relay apparatus 200 transmits, to the information providing apparatus 100, the connection request received from the communication terminal 400. If checked with, by the information providing apparatus 100, about a connection request, the relay apparatus 200 judges whether or not a connection request including the information providing apparatus ID of the information providing apparatus 100 is stored therein. Then, if stored therein a connection request including the information providing apparatus ID of the information providing apparatus 100, the relay apparatus 200 transmits the connection request to the information providing apparatus 100.

At S210, the information providing apparatus 100 judges authenticatability based on the connection request received at S208. The information providing apparatus 100 judges authenticatability by checking whether or not the user ID, the password and the terminal ID included in the connection request match preregistered data.

At S212, upon judgment at S210 that the communication terminal 400 is authenticatable, the information providing apparatus 100 transmits, to the relay apparatus 200, a connection execution request for execution of communication connection with the communication terminal 400.

At S214, the relay apparatus 200 establishes a communication connection between the information providing apparatus 100 and the communication terminal 400. The relay apparatus 200 establishes a communication connection between the information providing apparatus 100 and the communication terminal 400, for example, by associating, as an IP address and a port number for identifying a logical line on the network 10 side, an IP address and a port number used for transmission of the connection execution request at S212 with an IP address and a port number used at the transmission of the connection request from the communication terminal 400 at S202.

Figure 3:
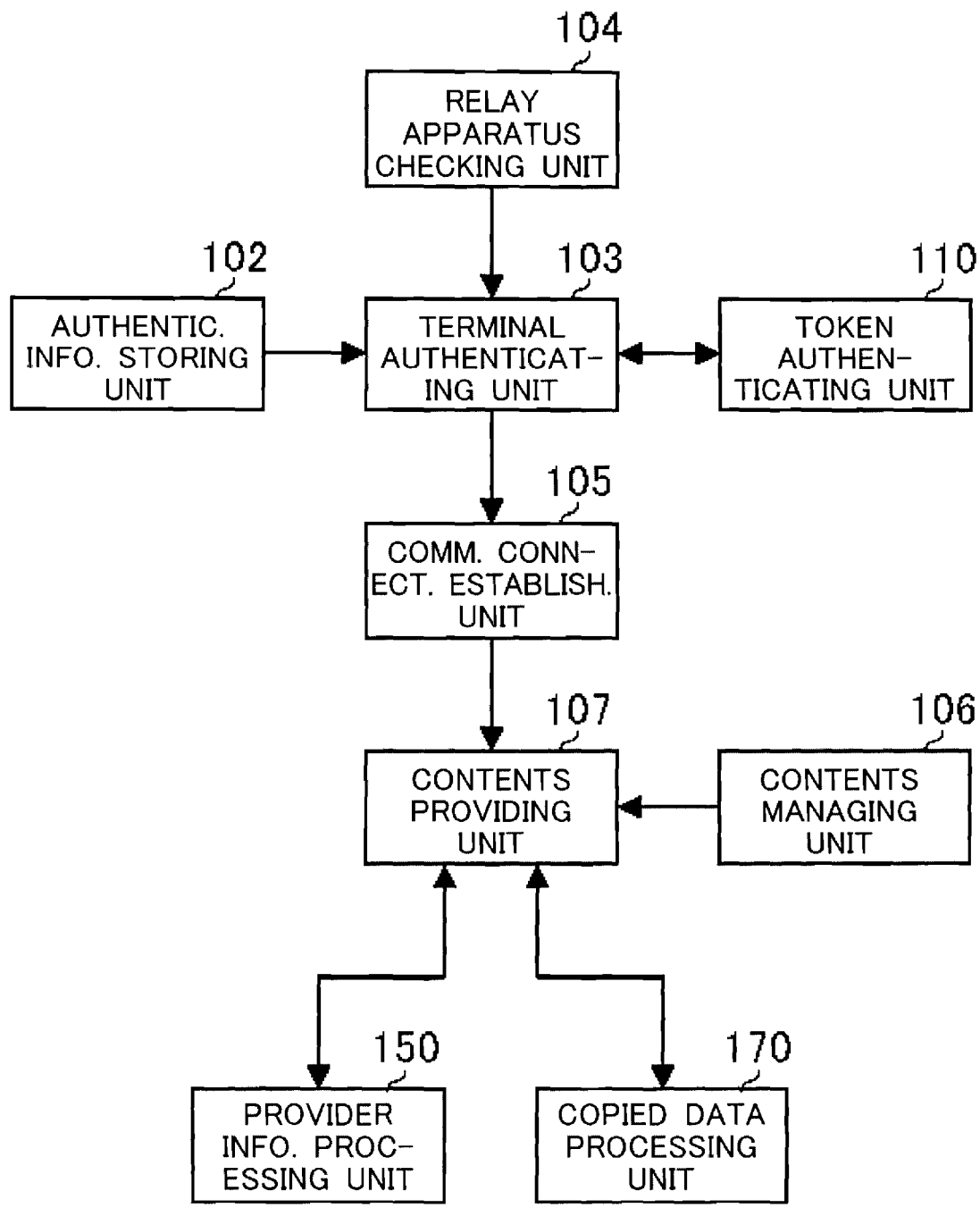
FIG. 3 schematically illustrates one example of a functional configuration of the information providing apparatus 100.

FIG. 3 schematically illustrates one example of a functional configuration of the information providing apparatus 100. The information providing apparatus 100 includes an authentication information storing unit 102, a terminal authenticating unit 103, a relay apparatus checking unit 104, a communication connection establishing unit 105, a contents managing unit 106, a contents providing unit 107, a token authenticating unit 110, a provider information processing unit 150 and a copied data processing unit 170. It is not essential for the information providing apparatus 100 to include all these configurations.

The authentication information storing unit 102 stores therein authentication information used for authenticating a communication terminal 400 that has transmitted a connection request. The authentication information may include a combination of a user ID, a password and a terminal ID. The terminal ID may be any data as long as it allows identification among a plurality of communication terminals 400 registered in the information providing service 101. For example, the terminal ID is a MAC address of a communication terminal 400. Also, the terminal ID may be data allotted by the information providing apparatus 100 when a communication terminal 400 is registered.

The terminal authenticating unit 103 judges authenticatability of a communication terminal 400 by using the authentication information stored in the authentication information storing unit 102, and if it is judged that the communication terminal 400 is authenticatable, authenticates the communication terminal 400. If it is judged that the communication terminal 400 is unauthenticatable, the terminal authenticating unit 103 does not authenticate the communication terminal 400. The terminal authenticating unit 103 manages the authenticated communication terminal 400 as being logged into the information providing service 101.

The terminal authenticating unit 103 according to the present embodiment can authenticate each communication terminal 400 among the plurality of communication terminals 400 based on a single user ID, and keep the plurality of communication terminals 400 logged into the information providing service 101. Thereby, a user owning the plurality of communication terminals 400 can log into the information providing service 101 simultaneously by using a single user ID at the plurality of communication terminals 400.

The relay apparatus checking unit 104 checks with the relay apparatus 200 intermittently whether or not various types of requests transmitted from communication terminals 400 to the information providing apparatus 100 are stored in the relay apparatus 200. For example, the relay apparatus checking unit 104 executes the checking regularly. Also, the relay apparatus checking unit 104 may execute the checking irregularly. The relay apparatus checking unit 104 may be one example of a paste request checking unit.

The communication connection establishing unit 105 establishes a communication connection with a communication terminal 400. The communication connection establishing unit 105 may establish a communication connection with a communication terminal 400 by transmitting a connection execution request to the relay apparatus 200.

The contents managing unit 106 manages contents located within the network 10 to be provided to a communication terminal 400. The contents located within the network 10 may be data memorized by an application server connected to the network 10. Electronic file data memorized by the file server 12, mail data memorized by the mail server 14 and web data memorized by the web server 16 may be examples of the contents located within the network 10. If, for example, contents memorized by the file server 12 is designated by a communication terminal 400 with which a communication connection is established by the communication connection establishing unit 105, the contents managing unit 106 receives the contents from the file server 12, and stores them therein. Also, the contents managing unit 106 may manage contents located within the network 50 to be provided to a communication terminal 400. The contents located within the network 50 may be data managed by a service connected to the network 50. For example, the contents located within the network 50 are data provided by the cloud service 52 and the cloud service 54.

The contents providing unit 107 provides contents managed by the contents managing unit 106 to a communication terminal 400 with which a communication connection is established by the communication connection establishing unit 105. For example, if contents memorized by the file server 12 are designated by a communication terminal 400, the contents providing unit 107 transmits the contents managed by the contents managing unit 106 to the communication terminal 400.

The token authenticating unit 110 executes a token authentication function. The token authenticating unit 110 authenticates a communication terminal 400 not logged into the information providing service 101 or a communication terminal 400 not registered in the information providing service 101, via a communication terminal 400 that has been authenticated by the terminal authenticating unit 103 and is logged into the information providing service 101.

The provider information processing unit 150 executes an active bookmark function. The provider information processing unit 150 executes the active bookmark function for a plurality of communication terminals 400 authenticated by at least any of the terminal authenticating unit 103 and the token authenticating unit 110.

The copied data processing unit 170 executes an inter-device clipboard function. The copied data processing unit 170 executes the inter-device clipboard function for a plurality of communication terminals 400 authenticated by at least any of the terminal authenticating unit 103 and the token authenticating unit 110.

Figure 4:
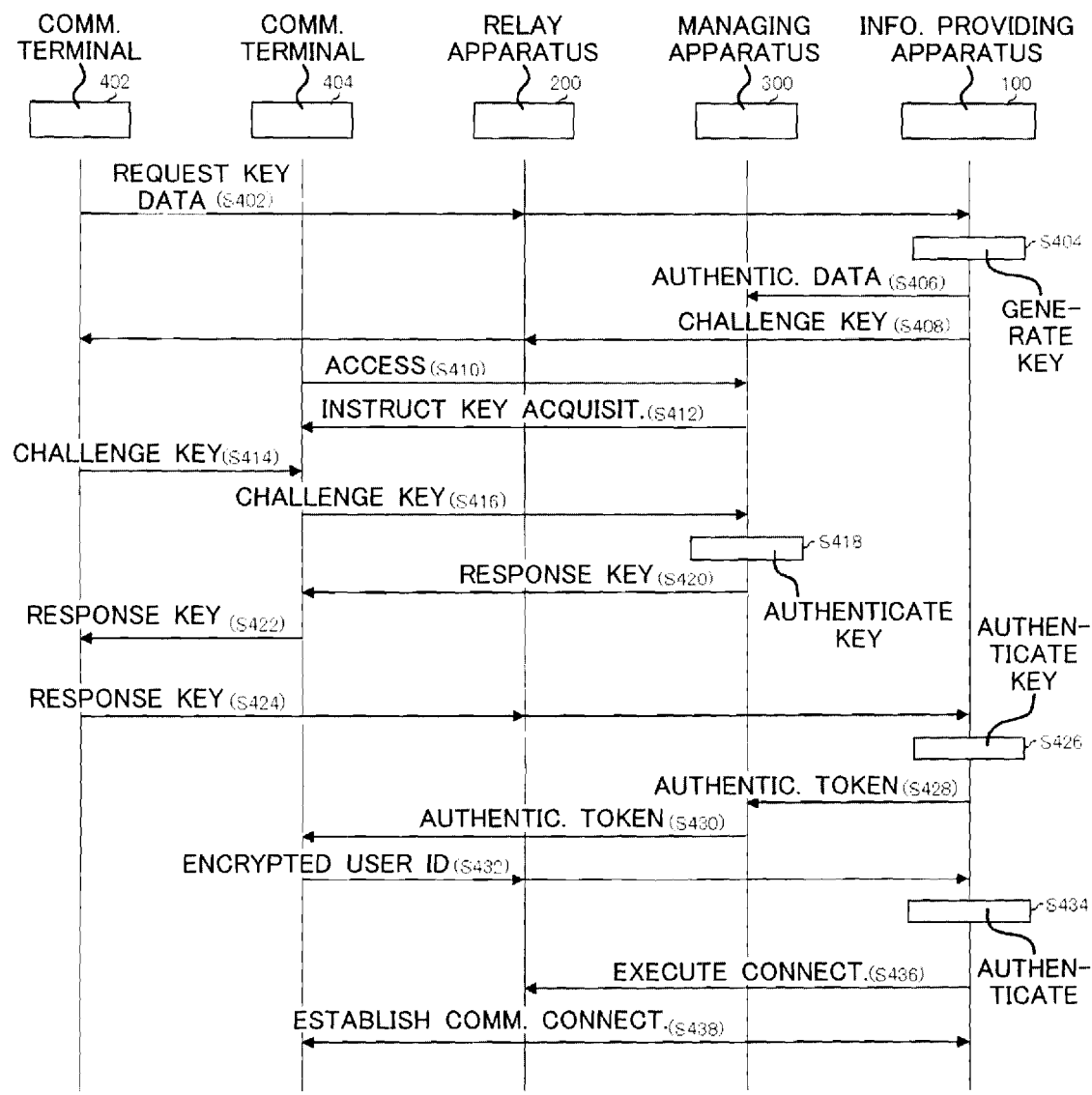
FIG. 4 schematically illustrates one example of a flow of processes performed by the information providing apparatus 100.

FIG. 4 schematically illustrates one example of a flow of processes performed by the information providing apparatus 100. FIG. 4 schematically illustrates a flow of processes that are performed if the token authenticating unit 110 of the information providing apparatus 100 executes the token authentication function. Here, in the explanation, it is assumed that initially, a user is utilizing a communication terminal 402 and a communication terminal 404, and the communication terminal 402 is logged into the information providing service 101. As illustrated in FIG. 4, the communication terminal 402 and the communication terminal 404, and the information providing apparatus 100 may communicate via the relay apparatus 200.

At S402, the communication terminal 402 transmits, to the information providing apparatus 100, a key data request to request a challenge key. The challenge key may be one example of first key data.

At S404, the information providing apparatus 100 generates key data upon reception of the key data request. The information providing apparatus 100 may generate a challenge key and a response key. The response key may be one example of second key data.

At S406, the information providing apparatus 100 generates authentication data for authenticating a communication terminal other than the communication terminal 402, and transmits it to the managing apparatus 300. The information providing apparatus 100 may generate authentication data including the challenge key and the response key generated at S404, and a user ID used, at the time of authentication, by the communication terminal 402 that has transmitted the key data request. The managing apparatus 300 stores therein the authentication data received.

At S408, the information providing apparatus 100 transmits, to the communication terminal 402, the challenge key generated at S404. The communication terminal 402 that has received the challenge key may notify the user that the challenge key has been received.

At S410, the communication terminal 404 accesses the managing apparatus 300. After transmission of the key data request by the communication terminal 402, the user of the communication terminal 402 and the communication terminal 404 accesses the managing apparatus 300 by using the communication terminal 404 that he/she wishes to have logged into the information providing service 101.

At S412, the managing apparatus 300 transmits a key acquisition instruction to the communication terminal 404. Upon reception of the key acquisition instruction, the communication terminal 404 shifts to a state where it waits for a challenge key. The communication terminal 404 may shift to a reception standby state where it is to receive a challenge key via near field wireless communication. The near field wireless communication is, for example, a wireless LAN (Local Area Network) such as Bluetooth (registered trademark), NFC (Near field wireless communication or Wi-Fi (registered trademark (Wireless Fidelity), optical communication, audio communication other than wireless communication, etc.

At S414, the communication terminal 402 transmits a challenge key to the communication terminal 404. The communication terminal 402, for example, first, searches for a communication terminal that is within a range within which the communication terminal 402 can perform communication by near field wireless communication, and has shifted to a reception standby state. Then, if a communication terminal that has shifted to a reception standby state has been detected, the communication terminal 402 transmits, to the communication terminal, a challenge key by using a near field wireless communication function.

Although here the explanation is about an example in which the communication terminal 404 receives a challenge key from the communication terminal 402 via near field wireless communication, examples are not limited thereto. The communication terminal 404 may accept an input of a challenge key from the user. For example, first, the communication terminal 402 displays thereon a challenge key received at S408. Also, upon reception of the key acquisition instruction at S412, the communication terminal 404 displays thereon an input screen for inputting a challenge key. Then, the user views the challenge key displayed on the communication terminal 402, and inputs it to the communication terminal 404.

At S416, the communication terminal 404 transmits, to the managing apparatus 300, the challenge key acquired at S414. At S418, the managing apparatus 300 judges authenticatability based on the challenge key received at S416 and the authentication data received at S406. The managing apparatus may judge that the communication terminal 404 is authenticatable if it determines that the challenge key received at S416 and the challenge key included in the authentication data match. If judged that the communication terminal 404 is unauthenticatable, the managing apparatus 300 may notify at least any of the communication terminal 402 and the communication terminal 404 that the communication terminal 404 is unauthenticatable.

At S420, the managing apparatus 300 transmits, to the communication terminal 404, the response key included in the authentication data received at S406. At S422, the communication terminal 404 transmits the response key to the communication terminal 402 via near field wireless communication.

Although here the explanation is about an example in which the communication terminal 402 receives a response key from the communication terminal 404 via near field wireless communication, examples are not limited thereto. The communication terminal 402 may accept an input of a response key from the user. For example, first, the communication terminal 404 displays thereon the response key received at S420. Also, after having transmitted the challenge key at S414, the communication terminal 402 displays thereon an input screen for inputting the response key. Then, the user views the response key displayed on the communication terminal 404, and inputs it to the communication terminal 402.

At S424, the communication terminal 402 transmits, to the information providing apparatus 100, the response key acquired at S422. At S426, the information providing apparatus 100 judges authenticatability based on the response key received at S424 and the response key generated at S404.

The information providing apparatus 100 may judge that the communication terminal 404 is authenticatable if it determines that the response key received at S424 and the response key generated at S404 match. If judged that the communication terminal 404 is unauthenticatable, the information providing apparatus 100 may notify at least any of the communication terminal 402 and the communication terminal 404 that the communication terminal 404 is unauthenticatable.

At S428, the information providing apparatus 100 generates an authentication token and transmits it to the managing apparatus 300. The information providing apparatus 100 may generate an authentication token including the user ID used, at the time of authentication, by the communication terminal 402 that has transmitted the key data request, and address information of the relay apparatus 200. The information providing apparatus 100 may generate an authentication token including an encrypted user ID obtained by encryption using a previously stored cryptographic key.

At S430, the managing apparatus 300 transmits, to the communication terminal 404, the authentication token received at S428. At S432, by referring to the address information of the relay apparatus 200 included in the authentication token received at S430, the communication terminal 404 transmits, to the relay apparatus 200, the encrypted user ID included in the authentication token.

At S434, the information providing apparatus 100 judges authenticatability based on the encrypted user ID received at S432 and the user ID included in the authentication data generated at S406. If determined that the user ID obtained by decoding the encrypted user ID and the user ID included in the authentication data match, the information providing apparatus 100 may judge that the communication terminal 404 is authenticatable. If judged that the communication terminal 404 is unauthenticatable, the information providing apparatus 100 may notify at least any of the communication terminal 402 and the communication terminal 404 that the communication terminal 404 is unauthenticatable.

At S436, the information providing apparatus 100 transmits a connection execution request to the relay apparatus 200. At S438, the relay apparatus 200 establishes a communication connection between the information providing apparatus 100 and the communication terminal 404. Thereby, the communication terminal 404 becomes logged into the information providing service 101 based on the same user ID as that of the communication terminal 402. The terminal authenticating unit 103 may authenticate the communication terminal 402 and the communication terminal 404 based on a single user ID, and keep both the communication terminal 402 and the communication terminal 404 logged into the information providing service 101.

The information providing apparatus 100 may be one example of an authenticating apparatus. Also, the communication terminal 402 may be one example of a first communication terminal. Also, the communication terminal 404 may be one example of a second communication terminal.

Figure 5:
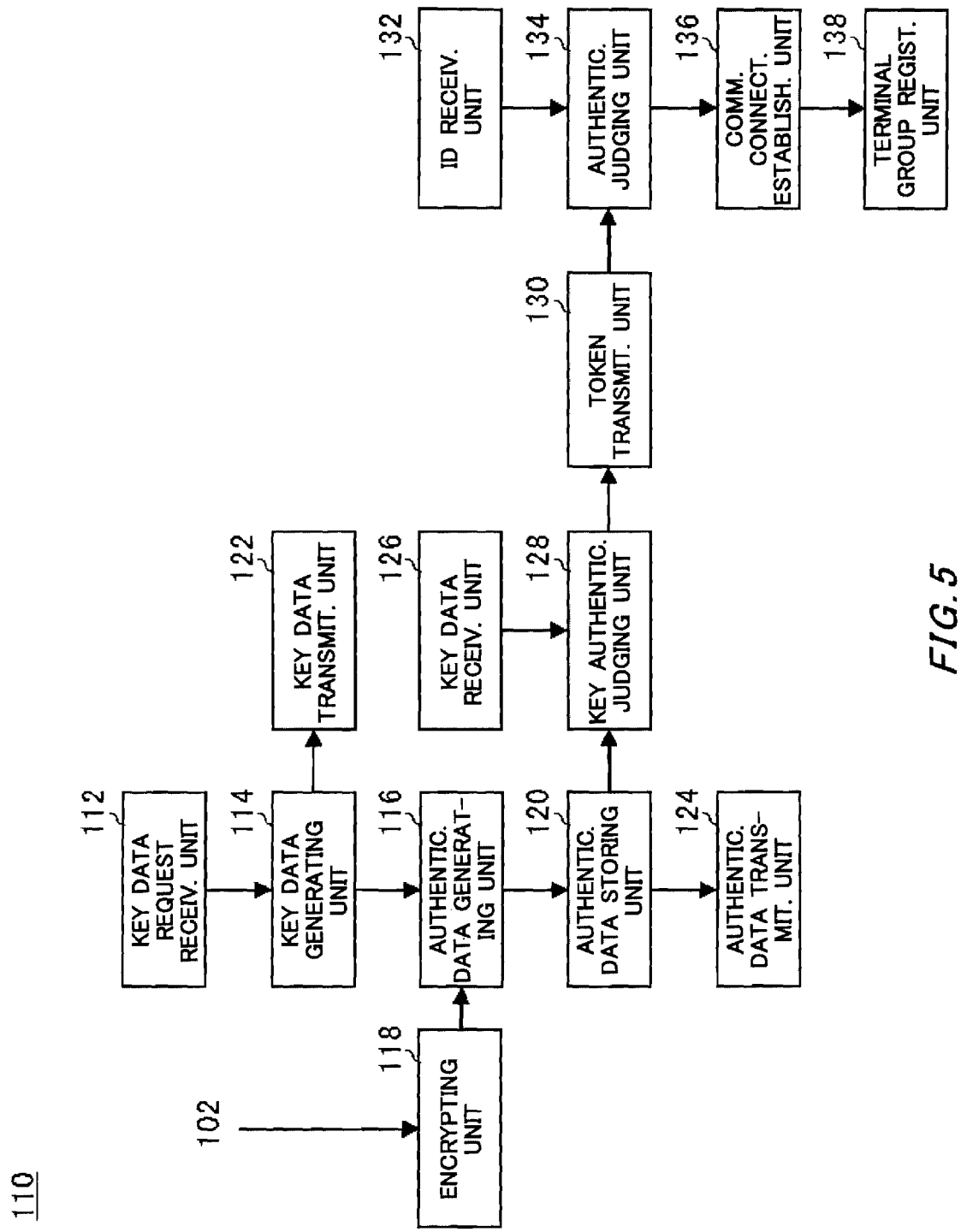
FIG. 5 schematically illustrates one example of a functional configuration of a token authenticating unit 110.

FIG. 5 schematically illustrates one example of a functional configuration of the token authenticating unit 110. The token authenticating unit 110 includes a key data request receiving unit 112, a key data generating unit 114, an authentication data generating unit 116, an encrypting unit 118, an authentication data storing unit 120, a key data transmitting unit 122, an authentication data transmitting unit 124, a key data receiving unit 126, a key authenticatability judging unit 128, a token transmitting unit 130, an ID receiving unit 132, an authenticatability judging unit 134, a communication connection establishing unit 136 and a terminal group registering unit 138. It is not essential for the token authenticating unit 110 to include all these configurations.

The key data request receiving unit 112 receives a key data request transmitted by a communication terminal 400. The key data request receiving unit 112 may receive the key data request via the relay apparatus 200.

The key data generating unit 114 generates key data upon reception, by the key data request receiving unit 112, of the key data request. The key data generating unit 114 may generate a challenge key and a response key.

The authentication data generating unit 116 generates authentication data for authenticating a communication terminal 400 other than the communication terminal 400 that has transmitted the key data request. The authentication data may include the challenge key and the response key generated by the key data generating unit 114, and a user ID used, at the time of authentication, by the communication terminal 400 that has transmitted the key data request.

The encrypting unit 118 encrypts the user ID used, at the time of authentication, by the communication terminal 400 that has transmitted the key data request. The encrypting unit 118 may encrypt the user ID by using a previously stored cryptographic key. For example, the encrypting unit 118 encrypts the user ID by using a session key. The authentication data generating unit 116 may generate authentication data including: the challenge key and the response key; and the encrypted user ID encrypt by the encrypting unit 118. The authentication data storing unit 120 stores therein the authentication data generated by the authentication data generating unit 116.

The key data transmitting unit 122 transmits, to the communication terminal 400 that has transmitted the key data request, the challenge key generated by the key data generating unit 114. The key data transmitting unit 122 may transmit, via the relay apparatus 200, the challenge key to the communication terminal 400 that has transmitted the key data request. The key data transmitting unit 122 may be one example of a first key data transmitting unit. The authentication data transmitting unit 124 transmits, to the managing apparatus 300, the authentication data generated by the authentication data generating unit 116.

The key data receiving unit 126 receives a response key from the communication terminal 400 that has transmitted the key data request. The key data receiving unit 126 may be one example of a first key data receiving unit.

The key authenticatability judging unit 128 judges authenticatability based on the response key received by the key data receiving unit 126 and the response key generated by the key data generating unit 114. The key authenticatability judging unit 128 judges that the communication terminal 400 is authenticatable if it determines that the response key received by the key data receiving unit 126 and the response key generated by the key data generating unit 114 match. The key authenticatability judging unit 128 may be one example of a first key authenticatability judging unit.

If it is judged by the key authenticatability judging unit 128 that the communication terminal 400 is authenticatable, the token transmitting unit 130 transmits an authentication token to the managing apparatus 300. The token transmitting unit 130 may be one example of a first token transmitting unit. The ID receiving unit 132 receives an encrypted user ID from a communication terminal 400 other than the communication terminal 400 that has transmitted the key data request.

The authenticatability judging unit 134 judges authenticatability based on: the encrypted user ID received by the ID receiving unit 132; and the user ID included in the authentication data generated by the authentication data generating unit 116. The authenticatability judging unit 134 judges that the communication terminal 400 is authenticatable if it can decode the encrypted user ID, and determines that the decoded user ID and the user ID included in the authentication data match. The authenticatability judging unit 134 judges that the communication terminal 400 is unauthenticatable if it cannot decode the encrypted user ID, and if it determines that the decoded user ID and the user ID included in the authentication data do not match. The token authenticatability judging unit 134 may be one example of an ID authenticatability judging unit.

If it is judged by the authenticatability judging unit 134 that the communication terminal 400 is authenticatable, the communication connection establishing unit 136 establishes a communication connection with the communication terminal 400 that has transmitted the encrypted user ID received by the ID receiving unit 132. The communication connection establishing unit 136 may establish, by transmitting a connection establishment request to the relay apparatus 200, a communication connection with the communication terminal 400 that has transmitted the encrypted user ID.

The terminal group registering unit 138 registers, in the same terminal group, the communication terminal 400 that has transmitted the key data request received by the key data request receiving unit 112 and the communication terminal 400 with which the communication connection establishing unit 136 has established a communication connection.

Figure 6:
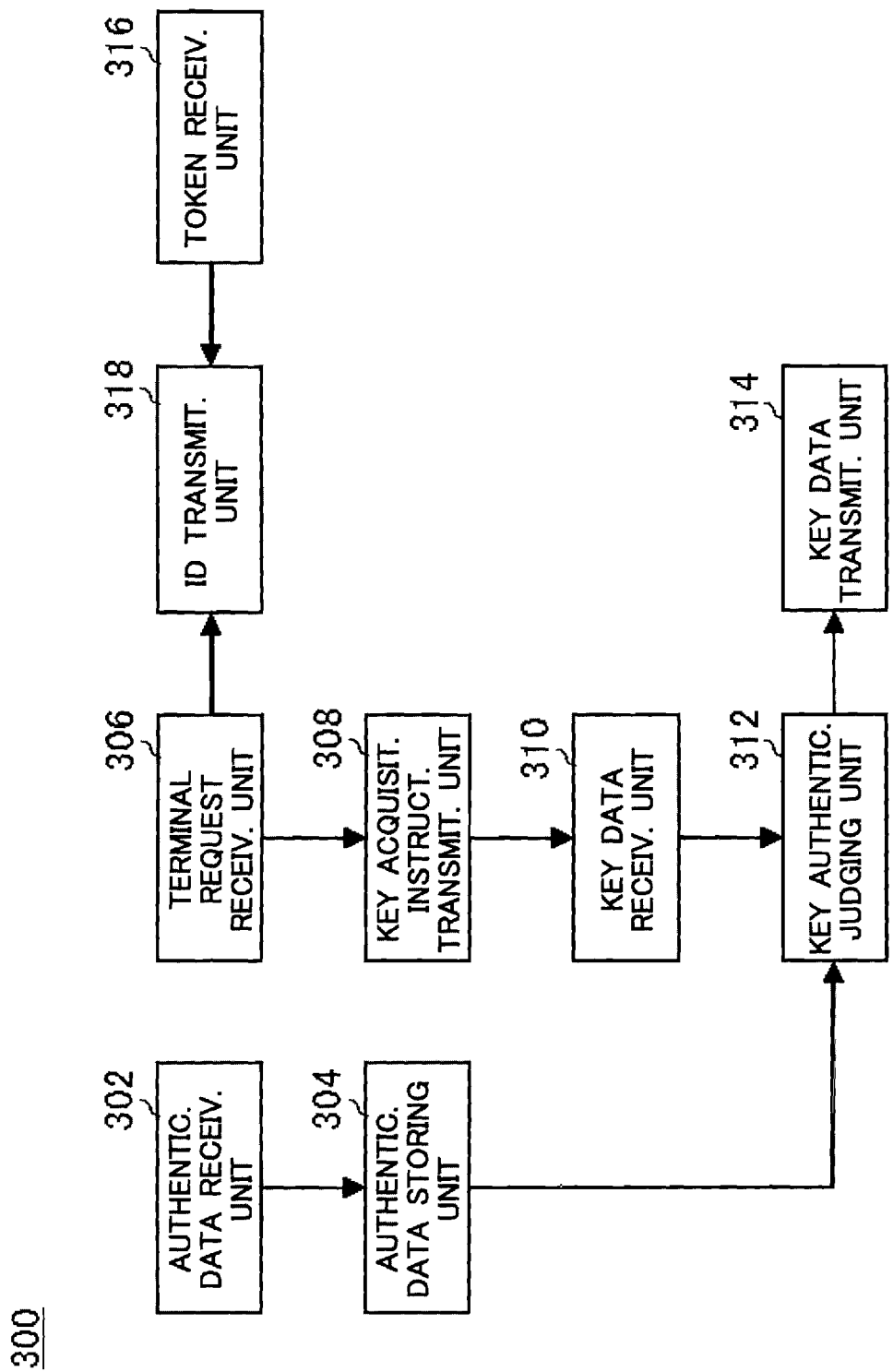
FIG. 6 schematically illustrates one example of a functional configuration of a managing apparatus 300.

FIG. 6 schematically illustrates one example of a functional configuration of the managing apparatus 300. The managing apparatus 300 includes an authentication data receiving unit 302, an authentication data storing unit 304, a terminal request receiving unit 306, a key acquisition instruction transmitting unit 308, a key data receiving unit 310, a key authenticatability judging unit 312, a key data transmitting unit 314, a token receiving unit 316 and an ID transmitting unit 318. It is not essential for the managing apparatus 300 to include all these configurations.

The authentication data receiving unit 302 receives authentication data transmitted by the authentication data transmitting unit 124. The authentication data storing unit 304 stores therein the authentication data received by the authentication data receiving unit 302.

The terminal request receiving unit 306 accepts access of a communication terminal 400. The access of the communication terminal 400 is, for example, an authentication request. Also, the access of the communication terminal 400 may be a request to acquire a key input page. If the terminal request receiving unit 306 has accepted the access of the communication terminal 400, the key acquisition instruction transmitting unit 308 transmits a key acquisition instruction to the communication terminal 400.

The key data receiving unit 310 receives a challenge key from the communication terminal 400 from which the terminal request receiving unit 306 has accepted the access. The key data receiving unit 310 may be one example of a second key data receiving unit.

The key authenticatability judging unit 312 judges authenticatability based on: the challenge key received by the key data receiving unit 310; and the challenge key included in the authentication data stored in the authentication data storing unit 304. The key authenticatability judging unit 312 may judge that the communication terminal 400 is authenticatable if it determines that the challenge key received by the key data receiving unit 310 and the challenge key included in the authentication data match. The key authenticatability judging unit 312 may be one example of a second key authenticatability judging unit.

The key data transmitting unit 314 transmits, to the communication terminal 400 from which the terminal request receiving unit 306 has accepted the access, the response key included in the authentication data stored in the authentication data storing unit 304 if it is judged by the key authenticatability judging unit 312 that the communication terminal 400 is authenticatable. The key data transmitting unit 314 may be one example of a second key data transmitting unit.

The token receiving unit 316 receives an authentication token transmitted by the token transmitting unit 130. The ID transmitting unit 318 transmits, to the communication terminal 400 from which the terminal request receiving unit 306 has accepted the access, the authentication token received by the token receiving unit 316.

Figure 7:
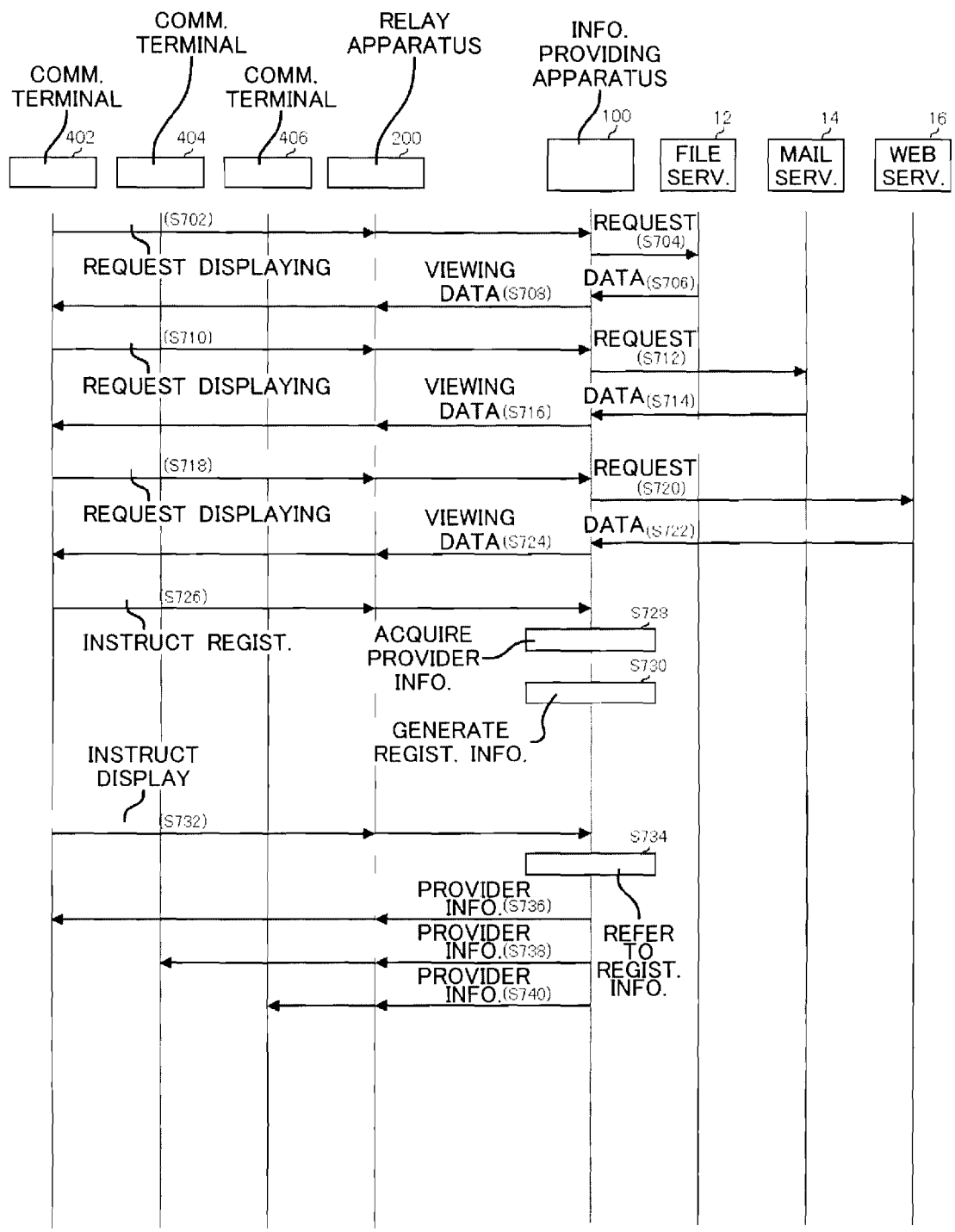
FIG. 7 schematically illustrates one example of a flow of processes performed by the information providing apparatus 100.

FIG. 7 schematically illustrates one example of a flow of processes performed by the information providing apparatus 100. FIG. 7 illustrates a flow of processes performed if the information providing apparatus 100 executes an active bookmark function. Here, the following explanation is about an example in which at least any of the terminal authenticating unit 103 and the token authenticating unit 110 executes the active bookmark function on the communication terminal 402, the communication terminal 404 and a communication terminal 406 that are authenticated based on a single user ID and logged into the information providing service 101. As illustrated in FIG. 7, the communication terminal 402, the communication terminal 404 and the communication terminal 406, and the information providing apparatus 100 may communicate via the relay apparatus 200.

At S702, the communication terminal 402 transmits, to the information providing apparatus 100, a request to display data memorized by the file server 12. At S704, the information providing apparatus 100 transmits, to the file server 12, a request to acquire the data requested by the communication terminal 402. At S706, in response to the acquisition request from the information providing apparatus 100, the file server 12 transmits the data to the information providing apparatus 100. At S708, the information providing apparatus 100 converts the data received from the file server 12 into viewing data to be displayed by the communication terminal 402, and transmits the viewing data to the communication terminal 402.

At S710, the communication terminal 404 transmits, to the information providing apparatus 100, a request to display data memorized by the mail server 14. At S712, the information providing apparatus 100 transmits, to the mail server 14, a request to acquire the data requested by the communication terminal 404. At S714, the mail server 14 transmits data to the information providing apparatus 100 in response to the acquisition request from the information providing apparatus 100. At S716, the information providing apparatus 100 converts the data received from the mail server 14 into viewing data to be displayed by the communication terminal 404, and transmits the viewing data to the communication terminal 404.

At S718, the communication terminal 406 transmits, to the information providing apparatus 100, a request to display data memorized by the web server 16. At S720, the information providing apparatus 100 transmits, to the web server 16, a request to acquire the data requested by the communication terminal 406. At S722, the web server 16 transmits data to the information providing apparatus 100 in response to the acquisition request from the information providing apparatus 100. At S724, the information providing apparatus 100 converts the data received from the web server 16 into viewing data to be displayed by the communication terminal 406, and transmits the viewing data to the communication terminal 406.

At S726, the communication terminal 402 transmits, to the information providing apparatus 100, a registration instruction to register provider registration information. The registration instruction may include a name of provider registration information. The registration instruction may be one example of an instruction to generate provider registration information.

At S728, upon reception of the registration instruction at S726, the information providing apparatus 100 acquires a plurality of pieces of provider information that indicate providers of data being displayed on each among the communication terminal 402, the communication terminal 404 and the communication terminal 406. In the example of FIG. 7, the information providing apparatus 100 acquires provider information that indicates the file server 12, provider information that indicates the mail server 14, and provider information that indicates the web server 16. At S730, the information providing apparatus 100 generates provider registration information including the plurality of pieces of provider information acquired at S728.

At S732, the communication terminal 402 transmits, to the information providing apparatus 100, an instruction to display the provider registration information that the registration instruction transmitted at S726 instructs to register. The display instruction may include a name of the provider registration information.

At S734, in response to the display instruction received at S732, the information providing apparatus 100 refers to the provider registration information generated at S730. The information providing apparatus 100 acquires the plurality of pieces of provider information included in the provider registration information. In the present example, the provider registration information includes the provider information that indicates the file server 12, the provider information that indicates the mail server 14, and the provider information that indicates the web server 16.

At S736, the information providing apparatus 100 transmits, to the communication terminal 402, the provider information that is acquired at S734 and indicates the file server 12. According to the received provider information, the communication terminal 402 transmits, to the information providing apparatus 100, a display request to request data of the file server 12.

At S738, the information providing apparatus 100 transmits, to the communication terminal 404, the provider information that is acquired at S734 and indicates the mail server 14. According to the received provider information, the communication terminal 404 transmits, to the information providing apparatus 100, a display request to request data of the mail server 14.

At S740, the information providing apparatus 100 transmits, to the communication terminal 406, the provider information that is acquired at S734 and indicates the web server 16. According to the received provider information, the communication terminal 406 transmits, to the information providing apparatus 100, a display request to request data of the web server 16.

With the above-mentioned process, operation statuses at a plurality of communication terminals 400 at a certain time point can be reproduced later at any time. Thereby, labor of a user, who utilizes a plurality of communication terminals 400, to reproduce operation statuses can be reduced if subsequent operations are to be performed.

Figure 8:
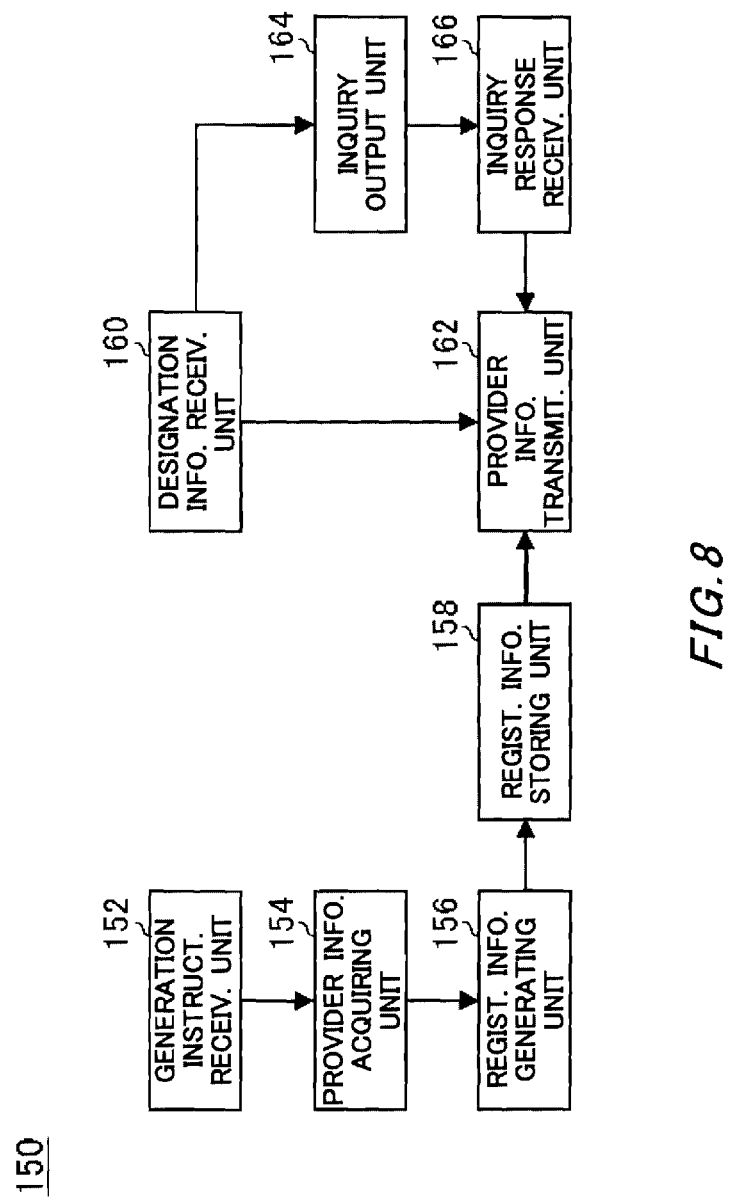
FIG. 8 schematically illustrates one example of a functional configuration of a provider information processing unit 150.

FIG. 8 schematically illustrates one example of a functional configuration of the provider information processing unit 150. The provider information processing unit 150 includes a generation instruction receiving unit 152, a provider information acquiring unit 154, a registration information generating unit 156, a registration information storing unit 158, a designation information receiving unit 160, a provider information transmitting unit 162, an inquiry output unit 164 and an inquiry response receiving unit 166. It is not essential for the provider information processing unit 150 to include all these configurations.

The generation instruction receiving unit 152 receives, from a communication terminal 400, an instruction to generate provider registration information. The instruction to generate provider registration information may include a name of the provider registration information. Also, the instruction to generate provider registration information may include a designation of a terminal group to be a target of which the provider registration information is generated. The designation of a terminal group may include a terminal ID of a communication terminal 400 belonging to the terminal group.

Upon reception, by the generation instruction receiving unit 152 and from the communication terminal 400, of the instruction to generate the provider registration information, the provider information acquiring unit 154 acquires the provider information. If the generation instruction includes a designation of a terminal group to be a target of which the provider registration information is generated, the provider information acquiring unit 154 acquires provider information that indicates providers of data being displayed by a communication terminal 400 indicated by a terminal ID included in the designation and the communication terminal 400 that has transmitted the generation instruction.

If the generation instruction does not include a designation of a terminal group to be a target of which the provider registration information is generated, the provider information acquiring unit 154 acquires provider information that indicates providers of data being displayed by: a communication terminal 400 that: has been authenticated based on the same user ID as that of the communication terminal 400 that has transmitted the instruction to generate provider registration information; and is logged into the information providing service 101; and the communication terminal 400 that has transmitted the generation instruction.

The registration information generating unit 156 generates provider registration information including a plurality of pieces of the provider information acquired by the provider information acquiring unit 154. The registration information generating unit 156 may generate provider registration information in which terminal IDs of communication terminals 400 to which each provider has been providing data are associated with each piece among the plurality of pieces of provider information.

The registration information storing unit 158 stores therein the provider registration information generated by the registration information generating unit 156. The registration information storing unit 158 may store therein the provider registration information in association with a name of provider registration information included in the instruction to generate provider registration information.

The designation information receiving unit 160 receives, from a communication terminal 400, designation information that designates provider registration information. The designation information may include a name of the provider registration information.

The provider information transmitting unit 162 acquires, from the registration information storing unit 158, the provider registration information designated by the designation information that the designation information receiving unit 160 has received, and refers to it. Then, the provider information transmitting unit 162 transmits the provider information to each communication terminal 400 among a plurality of communication terminals 400 so as to cause them to display data provided by providers indicated by the plurality of pieces of provider information included in the provider registration information that it referred to.

The provider information transmitting unit 162 may transmit a plurality of pieces of provider information to the communication terminal 400 that has transmitted the designation information, and communication terminals 400 that belong to the same terminal group as the communication terminal 400 that has transmitted the designation information. For example, the provider information transmitting unit 162 transmits the provider information to the communication terminal 400 that has transmitted the designation information, and a communication terminal 400 that: has been authenticated based on the same user ID as that of the communication terminal 400 that has transmitted the designation information; and is logged into the information providing service 101.

If, among a plurality of communication terminals 400 included in the same terminal group as the communication terminal 400 that has transmitted the designation information, the number of communication terminals 400 that are logged into the information providing service 101 is smaller than the number of communication terminals 400 corresponding to the plurality of pieces of provider information included in the provider registration information, the provider information transmitting unit 162 may transmit a plurality of pieces of provider information to at least any of the communication terminals 400 that are logged in.

Also, if terminal IDs are associated with the plurality of pieces of provider information, and a communication terminal 400 indicated by each terminal ID is logged into the information providing service 101, the provider information transmitting unit 162 may transmit the provider information to communication terminals 400 indicated by terminal IDs associated with each piece among the plurality of pieces of provider information.

If at least any communication terminal among a plurality of communication terminals 400 indicated by terminal IDs associated with each piece among the plurality of pieces of provider information is not logged into the information providing service 101, the provider information transmitting unit 162 may transmit, to any other communication terminal 400 among the plurality of communication terminals 400, provider information associated with a terminal ID of the communication terminal that is not logged in.

Also, the provider information transmitting unit 162 may transmit, to all the other communication terminals 400 among the plurality of communication terminals 400, data such as an icon that indicates provider information associated with a terminal ID of the communication terminal that is not logged in. If the data is designated by a user, the communication terminals 400 that have received the data may transmit a display request to the information providing apparatus 100 so as to display data provided by a provider indicated by the provider information.

Thereby, even if the number of communication terminals 400 that are logged into the information providing service 101 at the time when provider registration information is designated is smaller than that at the time when the provider registration information is registered, all the pieces of data provided by providers indicated by the plurality of pieces of provider information included in the provider registration information can be displayed by communication terminals 400 that are logged in.

When the designation information receiving unit 160 received the designation information, if at least any communication terminal 400 among communication terminals 400 identified by a plurality of terminal IDs associated with the plurality of pieces of provider information included in the provider registration information is not logged into the information providing service 101, the inquiry output unit 164 transmits inquiry information to the communication terminal that has transmitted the designation information. The inquiry information may include contents to inquire to which communication terminal 400 provider information corresponding to terminal IDs of communication terminals 400 that are not logged in is to be transmitted. Also, the inquiry information may include contents to inquire whether to transmit the provider information to no communication terminals 400.

The inquiry response receiving unit 166 receives a response to the inquiry information output by the inquiry output unit 164. In response to the response received by the inquiry response receiving unit 166, the provider information transmitting unit 162 may transmit the provider information to a plurality of communication terminals 400.

FIG. 9 schematically illustrates one example of a provider registration information table 500. In the provider registration information table 500, provider registration information for each terminal group may be registered. The provider registration information table 500 includes main terminal fields 502, group terminal fields 504, name fields 506 and provider information fields 508.

The main terminal fields 502 include terminal IDs of main terminals of terminal groups. The group terminal fields 504 include terminal IDs of group terminals of terminal groups. The group terminal fields 504 may include the numbers of group terminals belonging to terminal groups.

The name fields 506 include names of provider registration information. The provider information fields 508 include a plurality of pieces of provider information. If the group terminal fields 504 include terminal IDs, the provider information fields 508 may include provider information for each terminal ID. Also, if the group terminal fields 504 include the numbers of group terminals, the provider information fields 508 may include provider information for each communication terminal 400.

FIG. 9 illustrates, as an example, provider registration information having a name "for work" of a terminal group including terminal IDs: AAA001, AAA002, AAA003 and AAA004, and provider registration information having a name "for business trip" of a terminal group including a terminal ID: BBB001 and two communication terminals 400.

If received designation information that designates provider registration information having the name "for work" from any of communication terminals 400 having terminal IDs, AAA001, AAA002, AAA003 and AAA004, the information providing apparatus 100 transmits, to the communication terminal 400 having the terminal ID AAA001, provider information that indicates the file server 12 and the cloud service 52. In the present embodiment, the cloud service 52 is positioned within the network 50, but may be positioned within the network 10.

Also, the information providing apparatus 100 transmits, to the communication terminal 400 having the terminal ID AAA002, provider information that indicates the mail server 14. Also, the information providing apparatus 100 transmits, to the communication terminal 400 having the terminal ID AAA003, provider information that indicates the web server 16. Also, the information providing apparatus 100 transmits, to the communication terminal 400 having the terminal ID AAA04, provider information that indicates a cloud service B. In the present embodiment, the cloud service 54 is positioned within the network 50, but may be positioned within the network 10.

If received, from the communication terminal 400 having the terminal ID BBB001, designation information that designates provider registration information having the name "for business trip", the information providing apparatus 100 transmits, to the communication terminal 400 having the terminal ID BBB001, provider information that indicates the file server 12. Also, the information providing apparatus 100 transmits provider information that indicates the mail server 14 and the cloud service 52 to a first communication terminal 400, and transmits provider information that indicates the web server 16 to a second communication terminal 400, among a plurality of communication terminals 400 that have been: authenticated based on the same user ID as a user ID used, at the time of authentication, by the communication terminal 400 having the terminal ID BBB001; and logged into the information providing service 101.

Figure 10:
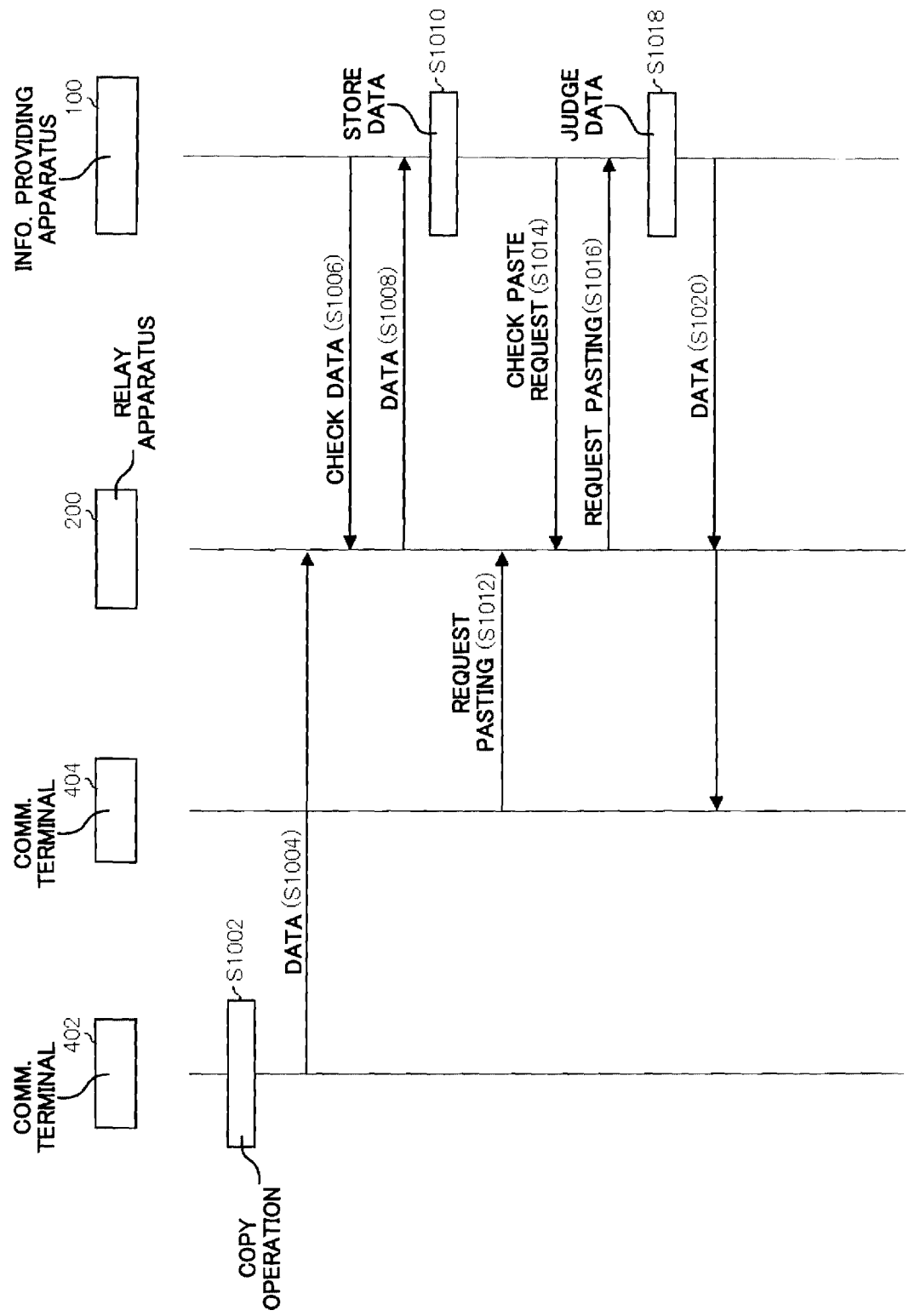
FIG. 10 schematically illustrates one example of a flow of processes performed by the information providing apparatus 100.

FIG. 10 schematically illustrates one example of a flow of processes performed by the information providing apparatus 100. FIG. 10 illustrates a flow of processes that are performed by the information providing apparatus 100 to paste, to the communication terminal 404, data on which a copy operation has been performed in the communication terminal 402. Here, in the following explanation, it is assumed that initially the communication terminal 402 and the communication terminal 404 have been authenticated based on a single user ID and both of them are logged into the information providing service 101.

At S1002, the communication terminal 402 executes a copy operation on data stored in the communication terminal 402. The communication terminal 402 may execute the copy operation according to an operation by the user of the communication terminal 402.

At S1004, in response to the copy operation at S1002, the communication terminal 402 transmits, to the relay apparatus 200, the data on which the copy operation has been performed. The communication terminal 402 may add information that indicates that it is the data on which a copy operation has been performed, and transmit the data to the relay apparatus 200. The relay apparatus 200 may store therein the received data in association with a terminal ID of the communication terminal 402 that has transmitted the data.

At S1006, the information providing apparatus 100 checks with the relay apparatus 200 whether or not data on which the copy operation has been performed has been transmitted to the relay apparatus 200 from any of a plurality of communication terminals 400 that are registered in the information providing service 101. The checking is executed by the relay apparatus checking unit 104.

At S1008, in response to the checking at S1006, the relay apparatus 200 transmits, to the information providing apparatus 100, the data received at S1004. The relay apparatus 200 may transmit, to the information providing apparatus 100, the data together with the terminal ID of the communication terminal 402.

At S1010, the information providing apparatus 100 stores therein the data received at S1008. The information providing apparatus 100 may store therein the data in association with the terminal ID received at S1008.

At S1012, the communication terminal 404 transmits a paste request to the relay apparatus 200. The relay apparatus 200 may store therein the received paste request in association with the terminal ID of the communication terminal 404 that has transmitted the paste request.

At S1014, the information providing apparatus 100 checks with the relay apparatus 200 whether or not a paste request has been transmitted to the relay apparatus 200 from any of the plurality of communication terminals 400 registered in the information providing service 101. The checking is executed by the relay apparatus checking unit 104.

At S1016, in response to the checking at S1014, the relay apparatus 200 transmits, to the information providing apparatus 100, the paste request received at S1012. The relay apparatus 200 may transmit, to the information providing apparatus 100, the paste request together with the terminal ID of the communication terminal 404.

At S1018, upon reception of the paste request at S1016, the information providing apparatus 100 judges whether or not data received from the communication terminal 402 that: has been authenticated based on the same user ID as that of the communication terminal 404 indicated by the terminal ID received together with the paste request; and is logged into the information providing service 101 is stored.

At S1020, upon judgment at S1018 that the data is stored, the information providing apparatus 100 transmits, to the communication terminal 404, the data stored at S1010. The information providing apparatus 100 may transmit the data to the communication terminal 404 via the relay apparatus 200.

With the above-mentioned process, the user of the communication terminal 402 and the communication terminal 404 can easily paste the data copied in the communication terminal 402 to the communication terminal 404 as if he/she is copying and pasting the data between the communication terminal 402 and the communication terminal 404.

Figure 11:
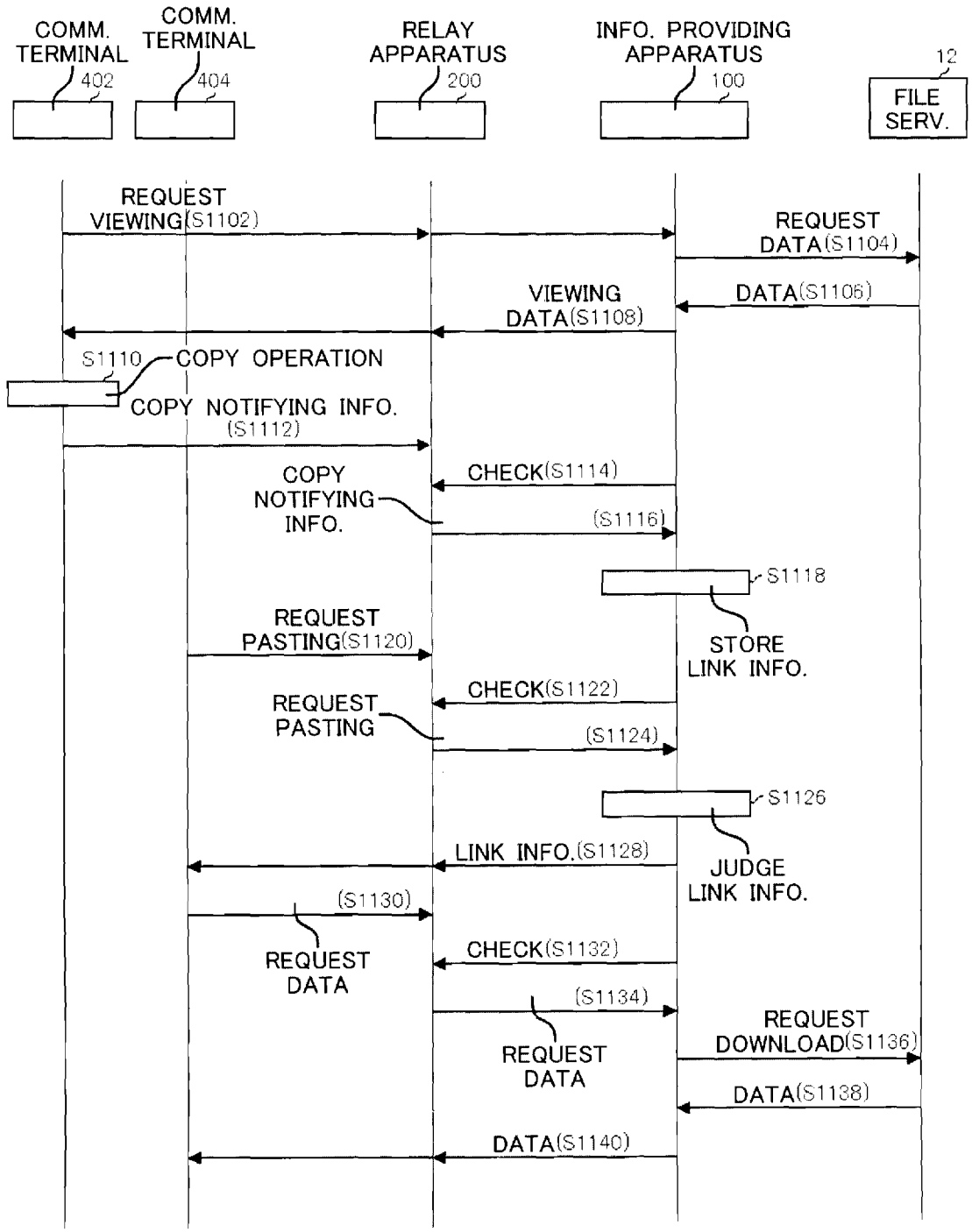
FIG. 11 schematically illustrates one example of a flow of processes performed by the information providing apparatus 100.

FIG. 11 schematically illustrates one example of a flow of processes performed by the information providing apparatus 100. FIG. 11 illustrates a flow of processes that are performed by the information providing apparatus 100 to paste, to the communication terminal 404, data located within the network 10 on which a copy operation has been performed in the communication terminal 402. Here, in the following explanation, it is assumed that initially the communication terminal 402 and the communication terminal 404 have been authenticated based on a single user ID, and both of them are logged into the information providing service 101.

At S1102, the communication terminal 402 positioned within the network 50 transmits, to the information providing apparatus 100 via the relay apparatus 200, a viewing request to view data memorized by the file server 12. At S1104, in response to the viewing request received at S1102, the information providing apparatus 100 transmits a data request to the file server 12.

At S1106, in response to the data request received at S1104, the file server 12 transmits the data to the information providing apparatus 100. At S1108, the information providing apparatus 100 generates viewing data for displaying, on the communication terminal 402, the data received from the file server 12, and transmits the viewing data to the communication terminal 402.

At S1110, the communication terminal 402 detects a copy operation on data that it is displaying and is memorized by the file server 12. At S1112, the communication terminal 402 transmits, to the relay apparatus 200, copy notifying information that indicates that a copy operation has been performed on the data memorized by the file server 12. The relay apparatus 200 stores therein the received copy notifying information.

At S1114, the information providing apparatus 100 checks with the relay apparatus 200 whether or not copy notifying information has been transmitted to the relay apparatus 200 from any of the plurality of communication terminals 400 registered in the information providing service 101. The checking is executed by the relay apparatus checking unit 104.

At S1116, in response to the checking at S1114, the relay apparatus 200 transmits, to the information providing apparatus 100, the copy notifying information received at S1112. The relay apparatus 200 may transmit, to the information providing apparatus 100, the copy notifying information together with the terminal ID of the communication terminal 402. At S1118, the information providing apparatus 100 stores therein link information for data on which the copy notifying information received at S1116 indicates a copy operation has been performed.

At S1120, the communication terminal 404 positioned within the network 50 transmits a paste request to the relay apparatus 200. The communication terminal 404 may transmit, to the relay apparatus 200, the paste request together with the terminal ID of the communication terminal 404. The relay apparatus 200 may store therein the received paste request in association with the terminal ID of the communication terminal 404.

At S1122, the information providing apparatus 100 checks with the relay apparatus 200 whether or not a paste request has been transmitted to the relay apparatus 200 from any of the plurality of communication terminals 400 registered in the information providing service 101. The checking is executed by the relay apparatus checking unit 104.

At S1124, in response to the checking at S1122, the relay apparatus 200 transmits, to the information providing apparatus 100, the paste request received at S1120. The relay apparatus 200 may transmit, to the information providing apparatus 100, the paste request together with the terminal ID of the communication terminal 404.

At S1126, in response to the paste request received at S1124, the information providing apparatus 100 judges whether or not link information for the data on which the copy notifying information transmitted by the communication terminal 402 that: has been authenticated based on the same user ID as that of the communication terminal 404 that has transmitted the paste request; and is logged into the information providing service 101 indicates a copy operation has been performed is stored. At S1128, upon judgment at S1126 that the link information is stored, the information providing apparatus 100 transmits the link information to the communication terminal 404.

At S1130, the communication terminal 404 transmits, to the relay apparatus 200, a data request to the file server 12 by using the link information received at S1128. The relay apparatus 200 stores therein the received data request in association with the terminal ID of the communication terminal 404.

At S1132, the information providing apparatus 100 checks with the relay apparatus 200 whether or not a data request has been transmitted to the relay apparatus 200 from any of the plurality of communication terminals 400 registered in the information providing service 101. The checking is executed by the relay apparatus checking unit 104.

At S1134, in response to the checking at S1132, the relay apparatus 200 transmits, to the information providing apparatus 100, the data request received at S1130. The relay apparatus 200 may transmit, to the information providing apparatus 100, the data request together with the terminal ID of the communication terminal 404.

At S1136, in response to the data request received at S1134, the information providing apparatus 100 transmits, to the file server 12, a request to download data. At S1138, in response to the download request received at S1136, the file server 12 transmits the data to the information providing apparatus 100. At S1140, the information providing apparatus 100 transmits, to the communication terminal 404, the data received at S1138.

With the above-mentioned process, the user of the communication terminal 402 and the communication terminal 404 can easily paste the data that is viewed at the communication terminal 402 and is located within the file server 12 to the communication terminal 404 as if he/she is copying and pasting the data between the communication terminal 402 and the communication terminal 404.

Figure 12:
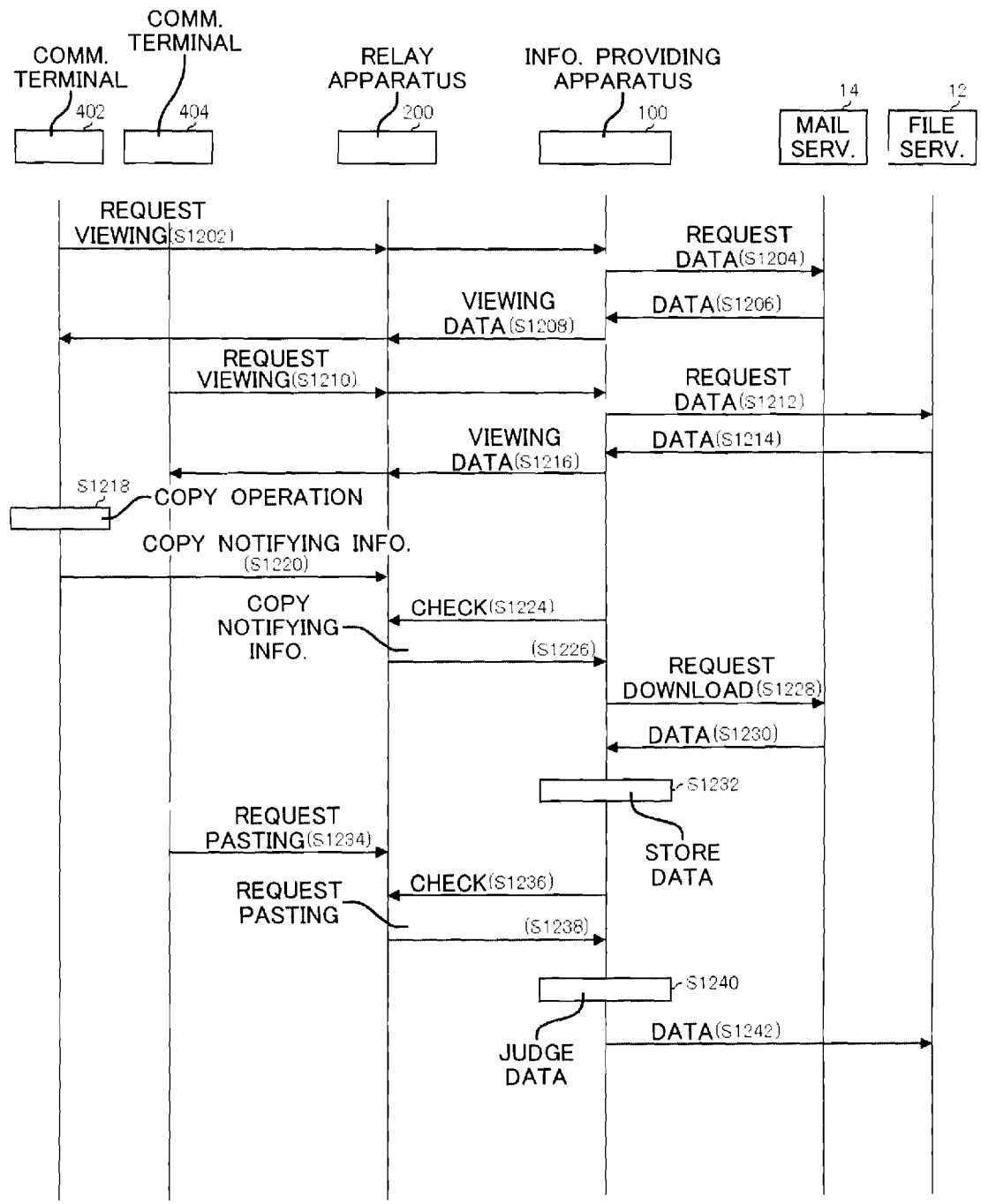
FIG. 12 schematically illustrates one example of a flow of processes performed by the information providing apparatus 100.

FIG. 12 schematically illustrates one example of a flow of processes performed by the information providing apparatus 100. FIG. 12 illustrates a flow of processes that are performed by the information providing apparatus 100 to paste, within the network 10 in response to a paste request from the communication terminal 404, data located within the network 10 on which a copy operation has been performed in the communication terminal 402. Here, in the following explanation, it is assumed that initially the communication terminal 402 and the communication terminal 404 have been authenticated based on a single user ID, and both of them are logged into the information providing service 101.

At S1202, the communication terminal 402 positioned within the network 50 transmits, to the information providing apparatus 100 via the relay apparatus 200, a viewing request to view data memorized by the mail server 14. At S1204, in response to the viewing request received at S1202, the information providing apparatus 100 transmits a data request to the mail server 14.

At S1206, in response to the data request received at S1204, the mail server 14 transmits the data to the information providing apparatus 100. At S1208, the information providing apparatus 100 generates viewing data for displaying, on the communication terminal 402, the data received from the mail server 14, and transmits the viewing data to the communication terminal 402.

At S1210, the communication terminal 404 positioned within the network 50 transmits, to the information providing apparatus 100 via the relay apparatus 200, a viewing request to view data memorized by the file server 12. At S1212, in response to the viewing request received at S1210, the information providing apparatus 100 transmits a data request to the file server 12.

At S1214, in response to the data request received at S1212, the file server 12 transmits the data to the information providing apparatus 100. At S1216, the information providing apparatus 100 generates viewing data for displaying, on the communication terminal 402, the data received from the file server 12, and transmits the viewing data to the communication terminal 402.

At S1218, the communication terminal 402 detects a copy operation on data that it is displaying and is memorized by the mail server 14. At S1220, the communication terminal 402 transmits, to the relay apparatus 200, copy notifying information that indicates that a copy operation has been performed on the data memorized by the mail server 14. The relay apparatus 200 stores therein the received copy notifying information.

At S1224, the information providing apparatus 100 checks with the relay apparatus 200 whether or not copy notifying information has been transmitted to the relay apparatus 200 from any of the plurality of communication terminals 400 registered in the information providing service 101. The checking is executed by the relay apparatus checking unit 104.

At S1226, in response to the checking at S1224, the relay apparatus 200 transmits, to the information providing apparatus 100, the copy notifying information received at S1220. The relay apparatus 200 may transmit, to the information providing apparatus 100, the copy notifying information together with the terminal ID of the communication terminal 402.

At S1228, the information providing apparatus 100 transmits, to the mail server 14, a download request to download data on which the copy notifying information received at S1226 indicates a copy operation has been performed. At S1230, in response to the download request received at S1228, the mail server 14 transmits data to the information providing apparatus 100. At S1232, the information providing apparatus 100 stores therein the data received at S1230.

At S1234, the communication terminal 404 transmits a paste request to the relay apparatus 200. The communication terminal 404 may transmit, to the relay apparatus 200, the paste request together with the terminal ID of the communication terminal 404. The relay apparatus 200 may store therein the received paste request in association with the terminal ID of the communication terminal 404.

At S1236, the information providing apparatus 100 checks with the relay apparatus 200 whether or not a paste request has been transmitted to the relay apparatus 200 from any of the plurality of communication terminals 400 registered in the information providing service 101. The checking is executed by the relay apparatus checking unit 104.

At S1238, in response to the checking at S1236, the relay apparatus 200 transmits, to the information providing apparatus 100, the paste request. The relay apparatus 200 may transmit, to the information providing apparatus 100, the paste request together with the terminal ID of the communication terminal 404.

At S1240, in response to the paste request received at S1238, the information providing apparatus 100 judges whether or not data on which the copy notifying information transmitted by the communication terminal 402 that: has been authenticated based on the same user ID as that of the communication terminal 404 that has transmitted the paste request; and is logged into the information providing service 101 indicates a copy operation has been performed is stored.

At S1242, upon judgment at S1240 that the data is stored, the information providing apparatus 100 transmits the data to the file server 12. The file server 12 stores therein the received data in association with the terminal ID of the communication terminal 404.

With the above-mentioned process, the user of the communication terminal 402 and the communication terminal 404 can easily paste the data that is viewed at the communication terminal 402 and is located within the mail server 14 to the file server 12 the data of which is viewed at the communication terminal 404 as if he/she is copying and pasting the data between the communication terminal 402 and the communication terminal 404.

Figure 13:
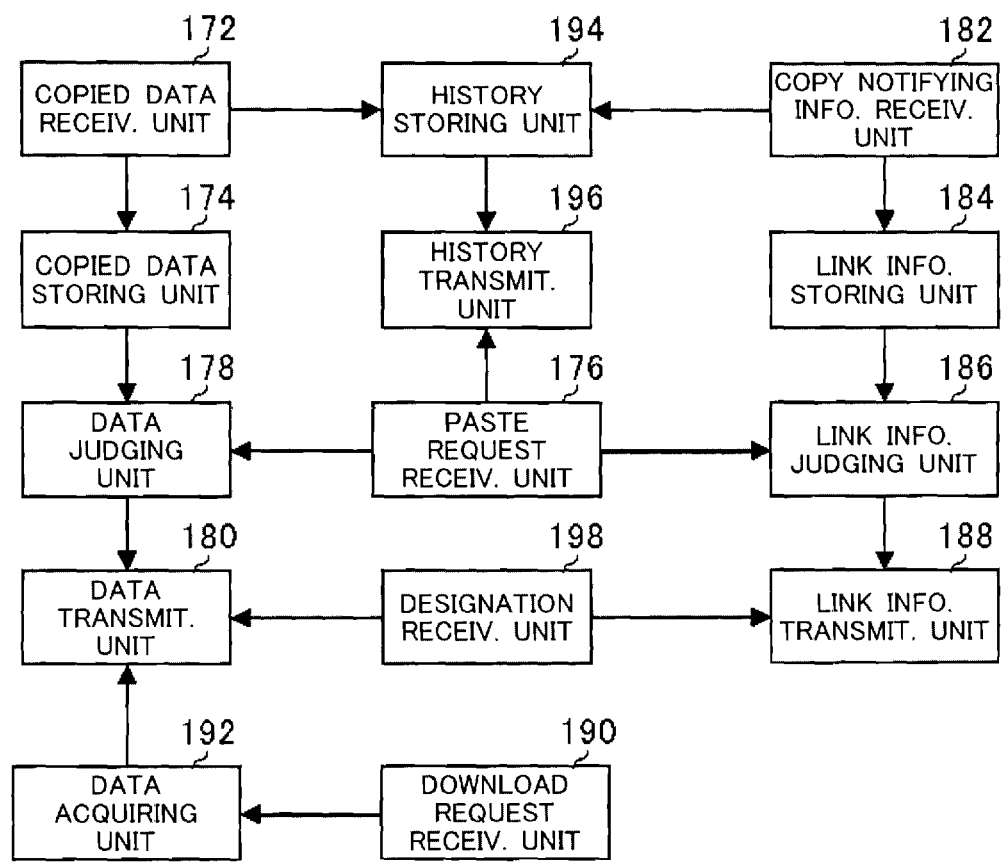
FIG. 13 schematically illustrates one example of a functional configuration of a copied data processing unit 170.

FIG. 13 schematically illustrates one example of a functional configuration of the copied data processing unit 170. The copied data processing unit 170 includes a copied data receiving unit 172, a copied data storing unit 174, a paste request receiving unit 176, a data judging unit 178, a data transmitting unit 180, a copy notifying information receiving unit 182, a link information storing unit 184, a link information judging unit 186, a link information transmitting unit 188, a download request receiving unit 190, a data acquiring unit 192, a history storing unit 194, a history transmitting unit 196 and a designation receiving unit 198.

It is not essential for the copied data processing unit 170 to include all these configurations.

The copied data receiving unit 172 receives, from a communication terminal 400 logged into the information providing service 101, copied data on which a copy operation has been performed in the communication terminal 400. The copied data may be text data, audio data, image data, an electronic file, etc.

The copied data storing unit 174 stores therein the copied data received by the copied data receiving unit 172. The copied data storing unit 174 may store therein the copied data in association with a terminal ID of a communication terminal 400 that has transmitted the copied data. The copied data storing unit 174 may measure a length of time that has elapsed after reception, by the copied data receiving unit 172, of the copied data. Then, the copied data storing unit 174 may delete the copied data if a predetermined length of time has elapsed after reception of the data by the copied data receiving unit 172. Thereby, the possibility of data being leaked can be reduced, and security can be enhanced.

The paste request receiving unit 176 receives a paste request from a communication terminal 400 logged into the information providing service 101. If the paste request receiving unit 176 has received the paste request, the data judging unit 178 judges whether or not copied data received from the communication terminal 400 that: has been authenticated based on the same user ID as that of the communication terminal 400 that has transmitted the paste request; and is logged into the information providing service 101 together with the communication terminal 400 that has transmitted the paste request is stored in the copied data storing unit 174.

In response to the paste request received by the paste request receiving unit 176, the data transmitting unit 180 transmits, to the communication terminal 400 that has transmitted the paste request, copied data stored in the copied data storing unit 174. If it is judged by the data judging unit 178 that the copied data is stored in the copied data storing unit 174, the data transmitting unit 180 may transmit the copied data to the communication terminal 400 that has transmitted the paste request.

The copy notifying information receiving unit 182 receives, from the communication terminal 400 positioned within the network 50 and logged into the information providing service 101, copy notifying information that indicates that in the communication terminal 400, a copy operation has been performed on data located within the network 10.

The link information storing unit 184 stores therein link information for data on which the copy notifying information received by the copy notifying information receiving unit 182 indicates a copy operation has been performed. The link information storing unit 184 may store therein link information in association with a terminal ID of the communication terminal 400 that has transmitted the copy notifying information.

If the paste request receiving unit 176 has received the paste request, the link information judging unit 186 judges whether or not link information for the data on which the copy notifying information that has been received from a communication terminal 400 that: has been authenticated based on the same user ID as that of the communication terminal 400 that has transmitted the paste request; and is logged into the information providing service 101 together with the communication terminal 400 that has transmitted the paste request indicates a copy operation has been performed is stored in the link information storing unit 184.

Upon reception, by the paste request receiving unit 176, of the paste request, the link information transmitting unit 188 transmits, to the communication terminal 400 that has transmitted the paste request, link information stored in the link information storing unit 184. If it is judged by the link information judging unit 186 that link information is stored in the link information storing unit 184, the link information transmitting unit 188 may transmit the link information to the communication terminal 404.

The download request receiving unit 190 receives, from a communication terminal 400, a request to download data located within the network 10. If the download request receiving unit 190 has received a download request, the data acquiring unit 192 acquires the requested data from a server or the like located within the network 10. The data transmitting unit 180 may transmit, to the communication terminal 400 that has transmitted the download request, the data acquired by the data acquiring unit 192. The data transmitting unit 180 and the data acquiring unit 192 may be examples of a memory control unit.

The history storing unit 194 stores therein a history of data that the copied data receiving unit 172 has received and on which copy operations have been performed in communication terminals 400. The history storing unit 194 may store therein the history of data for a predetermined period. If the predetermined period has elapsed after storage of the history of data, the history storing unit 194 may delete the history.

Also, the history storing unit 194 may store therein a history of data on which the copy notifying information received by the copy notifying information receiving unit 182 indicates copy operation have been performed. The history storing unit 194 may store therein the history of data for a predetermined period. If the predetermined period has elapsed after storage of the history of data, the history storing unit 194 may delete the history.

If the paste request receiving unit 176 has received a paste request from a communication terminal 400, the history transmitting unit 196 transmits, to the communication terminal 400, a history stored in the history storing unit 194. The communication terminal 400 may display-output the history received from the history transmitting unit 196. For example, if a history of three pieces of data is included in a history stored in the history storing unit 194, the communication terminal 400 display-outputs the history that indicates the three pieces of data.

The designation receiving unit 198 receives a designation of data for the history transmitted by the history transmitting unit 196. For example, if a history of three pieces of data is included in the history transmitted by the history transmitting unit 196, the designation receiving unit 198 receives, from a communication terminal 400, a designation of any piece of data among three pieces of data. The designation of data for a history may be performed by a user of a communication terminal 400.

Upon acceptance, by the designation receiving unit 198, of the designation of data for a history, the data transmitting unit 180 may transmit the designated data to the communication terminal 400 that has transmitted the designation of the data. Also, upon acceptance, by the designation receiving unit 198, of the designation of data for a history, the link information transmitting unit 188 may transmit link information corresponding to the designated data to the communication terminal 400 that has transmitted the designation of the data.

Figure 14:
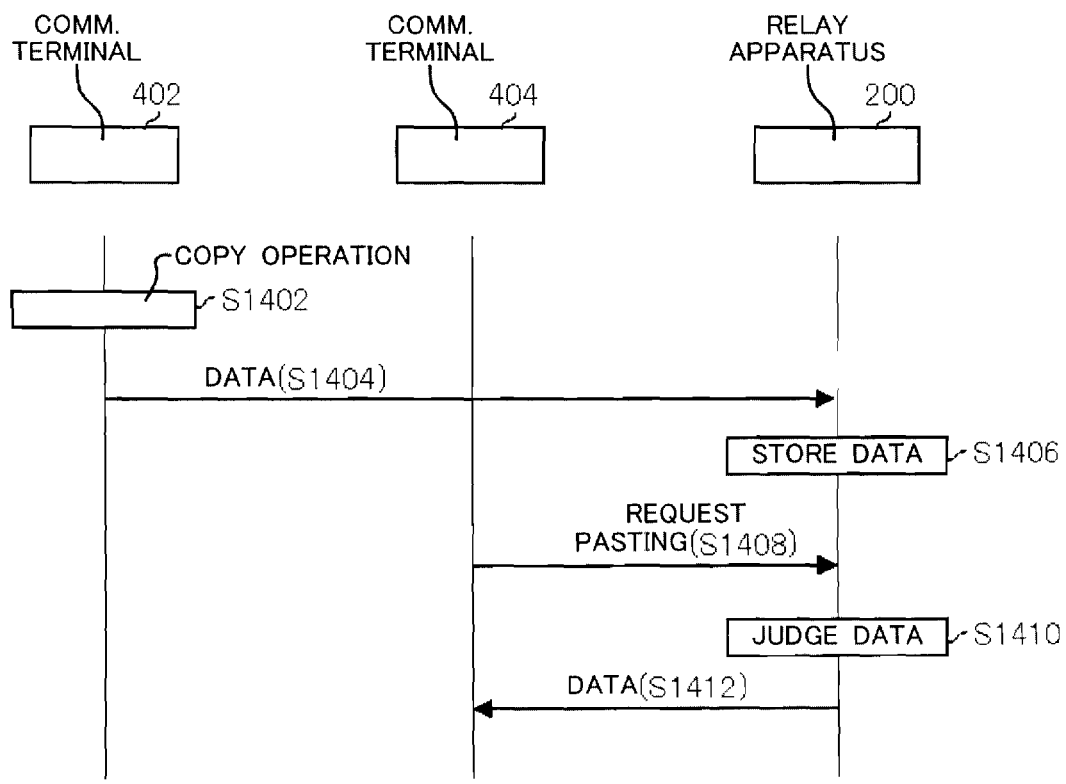
FIG. 14 schematically illustrates one example of a flow of processes performed by a relay apparatus 200.

FIG. 14 schematically illustrates one example of a flow of processes performed by the relay apparatus 200. FIG. 14 illustrates a flow of processes that are performed by the relay apparatus 200 to paste, to the communication terminal 404, data on which a copy operation has been performed in the communication terminal 402. Here, in the following explanation, it is assumed that initially the communication terminal 402 and the communication terminal 404 have been authenticated based on a single user ID, and both of them are logged into the information providing service 101.

At S1402, the communication terminal 402 executes a copy operation on data stored in the communication terminal 402. The communication terminal 402 may execute the copy operation according to an operation by the user of the communication terminal 402.

At S1404, in response to the copy operation at S1402, the communication terminal 402 transmits, to the relay apparatus 200, the data on which the copy operation has been performed. The communication terminal 402 may add information that indicates that it is the data on which a copy operation has been performed, and transmit the data to the relay apparatus 200.

At S1406, the relay apparatus 200 stores therein the data received at S1404. The relay apparatus 200 may store therein the received data in association with the terminal ID of the communication terminal 402 that has transmitted the data.

At S1408, the communication terminal 404 transmits a paste request to the relay apparatus 200. The communication terminal 404 may transmit, to the relay apparatus 200, the paste request together with the terminal ID of the communication terminal 404.

At S1410, in response to the paste request received at S1408, the relay apparatus 200 judges whether or not it stores therein data received from the communication terminal 402 that: has been authenticated based on the same user ID as that of the communication terminal 404 indicated by the terminal ID received together with the paste request; and is logged into the information providing service 101.

At S1412, upon judgment at S1410 that the data is stored, the relay apparatus 200 transmits, to the communication terminal 404, the data stored at S1406.

With the above-mentioned process, copying and pasting via the relay apparatus 200 can be realized between the communication terminal 402 and the communication terminal 404.

Figure 15:
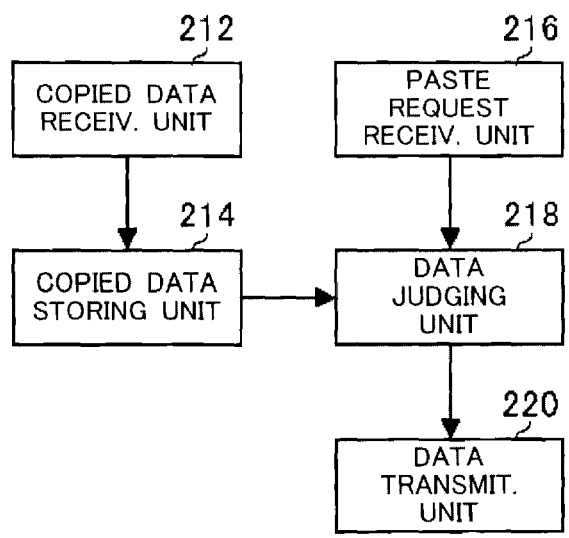
FIG. 15 schematically illustrates one example of a functional configuration of the relay apparatus 200.

FIG. 15 schematically illustrates one example of a functional configuration of a copied data processing unit 210 provided to the relay apparatus 200. The copied data processing unit 210 includes a copied data receiving unit 212, a copied data storing unit 214, a paste request receiving unit 216, a data judging unit 218 and a data transmitting unit 220.

The copied data receiving unit 212 receives, from a communication terminal 400, data on which a copy operation has been performed in the communication terminal 400. The copied data storing unit 214 stores therein the data received by the copied data receiving unit 212. The copied data storing unit 214 may store therein the data in association with a terminal ID of the communication terminal 400 that has transmitted the data.

The paste request receiving unit 216 receives a paste request from a communication terminal 400. Upon reception, by the paste request receiving unit 216, of the paste request, the data judging unit 218 judges whether or not data received from a communication terminal 400 that: has been authenticated based on the same user ID as that of the communication terminal 400 that has transmitted the paste request; and is logged into the information providing service 101 is stored in the copied data storing unit 214.

If it is judged by the data judging unit 218 that the data received from a communication terminal 400 that: has been authenticated based on the same user ID as that of the communication terminal 400 that has transmitted the paste request; and is logged into the information providing service 101 is stored in the copied data storing unit 214, the data transmitting unit 220 transmits the data to the communication terminal 400 that has transmitted the paste request.

Figure 16:
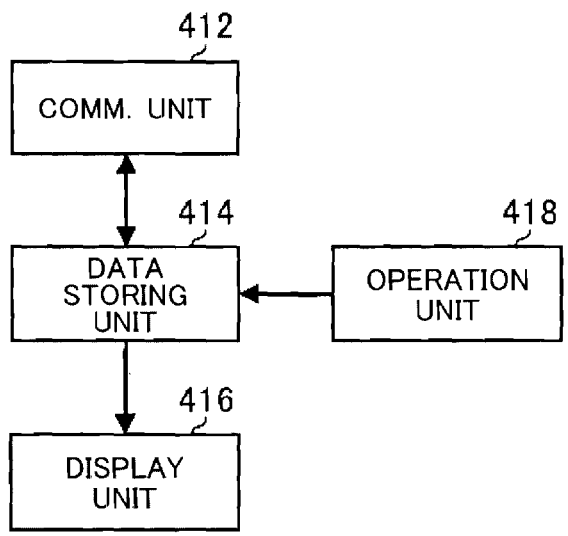
FIG. 16 schematically illustrates one example of a functional configuration of a communication terminal 400.

FIG. 16 schematically illustrates one example of a functional configuration of a communication terminal 400. The communication terminal 400 has a communicating unit 412, a data storing unit 414, a display unit 416 and an operation unit 418.

The communicating unit 412 performs communication via the network 50. It is possible for the communication terminal 400 to be positioned within the network 10, and if the communication terminal 400 is positioned within the network 10, the communicating unit 412 performs communication via the network 10.

The data storing unit 414 stores therein various types of data. The data storing unit 414 may store therein data received by the communicating unit 412. The communicating unit 412 may transmit data stored in the data storing unit 414.

The display unit 416 displays data stored in the data storing unit 414. The display unit 416 may be a touch panel display.

The operation unit 418 accepts an operation from a user. The operation unit 418, for example, accepts a touch operation on the display unit 416 which is a touch panel display. Also, the operation unit 418, for example, accepts an operation on an input unit such as a button or key provided to the communication terminal 400.

The operation unit 418 may accept a copy operation on data being displayed by the display unit 416. For example, first, if data being displayed on the display unit 416 is selected via the operation unit 418, the display unit 416 displays a menu for the selected data. The menu includes "copy". Then, the operation unit 418 accepts, as a copy operation on the data, selection of "copy" included in the menu.

Also, if any position in a display region of the display unit 416 is selected via the operation unit 418, the communicating unit 412 may transmit a paste request to the relay apparatus 200. If a notification that there is data to be a target of pasting is accepted from the relay apparatus 200 when the communicating unit 412 has transmitted a paste request to the relay apparatus 200, the display unit 416 may display a menu including "paste". Then, if the operation unit 418 has accepted selection of "paste" included in the menu, the communicating unit 412 may receive, from the relay apparatus 200, the data to be a target of pasting, and store it in the data storing unit 414.

Figure 17:
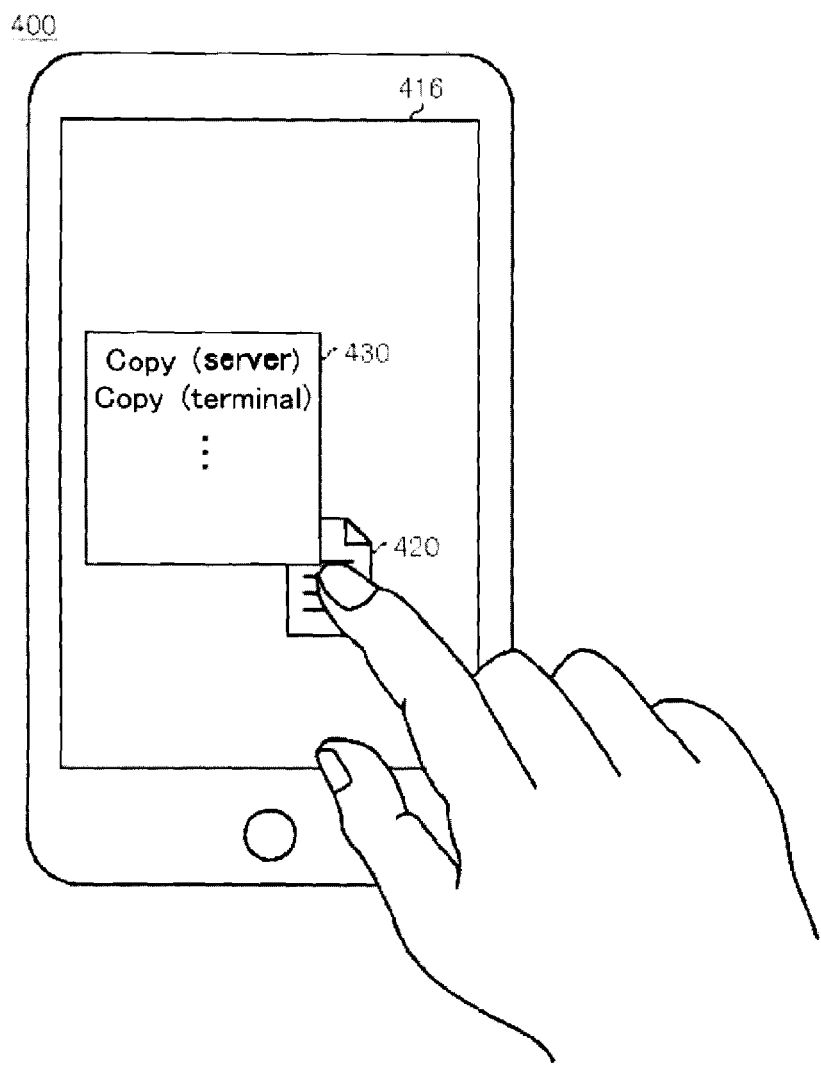
FIG. 17 schematically illustrates a display example of the communication terminal 400.

FIG. 17 schematically illustrates a display example of a communication terminal 400. FIG. 17 illustrates an example in which, upon detection of a touch operation on a data icon 420 displayed on the display unit 416, the display unit 416 has displayed a menu 430 including "copy (server)" that indicates "copy" for pasting outside the communication terminal 400, and "copy (terminal)" that indicates "copy" for pasting inside the communication terminal 400.

If data indicated by the data icon 420 is data located within the communication terminal 400, and "copy (server)" is selected, the communicating unit 412 may transmit the data to the information providing apparatus 100 via the relay apparatus 200 as data on which a copy operation has been performed. Also, if data indicated by the data icon 420 is data located within the network 10, and "copy (server)" is selected, the communicating unit 412 may transmit, to the information providing apparatus 100 via the relay apparatus 200, copy notifying information that indicates that a copy operation has been performed on the data within the network 10. If "copy (terminal)" is selected, the communication terminal 400 may copy data indicated by the data icon 420 to a clipboard.

Although in the example mentioned here, the menu 430 including "copy (server)" and "copy (terminal)" is displayed, the menu 430 is not limited thereto. The communication terminal 400 may display the menu 430 including one "copy" upon detection of a touch operation on the data icon 420. If the one "copy" is selected, the communication terminal 400 may transmit, to the information providing apparatus 100, data indicated by the data icon 420 or copy notifying information, and memorize the data in a clipboard. Also, if the one "copy" is selected, the communication terminal 400 may transmit, to the information providing apparatus 100, data indicated by the data icon 420 or copy notifying information, without memorizing the data in a clipboard.

Figure 18:
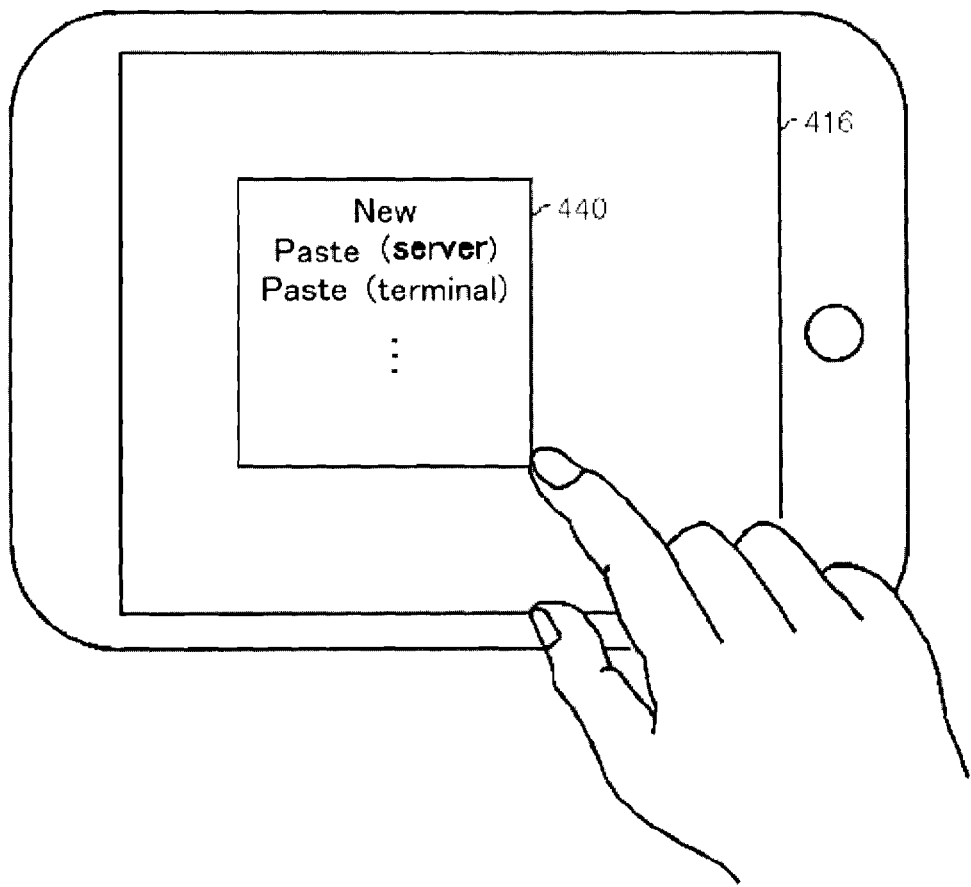
FIG. 18 schematically illustrates a display example of the communication terminal 400.

FIG. 18 schematically illustrates a display example of a communication terminal 400. FIG. 18 illustrates an example in which, upon detection of a touch operation on the display unit 416, the display unit 416 has displayed a menu 440 including "paste (server)" that indicates "paste" for pasting data received from outside the communication terminal 400, and "paste (terminal)" that indicates "paste" for pasting data inside the communication terminal 400.

If "paste (server)" is selected, the communication terminal 400 may paste data received from the information providing apparatus 100 via the relay apparatus 200. Also, if "paste (terminal)" is selected, the communication terminal 400 may paste data memorized in a clipboard of the communication terminal 400.

Although in the above-mentioned embodiment, the information providing apparatus 100 is explained as one example of a communication system, the information providing apparatus 100 is not limited thereto. The communication system may include the information providing apparatus 100 and the relay apparatus 200. Also, the communication system may include the information providing apparatus 100 and the managing apparatus 300. Also, the communication system may include the information providing apparatus 100, the relay apparatus 200 and the managing apparatus 300.

Also, although in the above-mentioned embodiment, an example in which the information providing apparatus 100 establishes a communication connection with a communication terminal 400 via the relay apparatus 200, and transmits and receives data to and from the communication terminal 400 via the relay apparatus 200, the manner of communication is not limited thereto. The information providing apparatus 100 may establish a communication connection with a communication terminal 400 via the relay apparatus 200, and transmit and receive data to and from the communication terminal 400 not via the relay apparatus 200.

Also, although the above-mentioned embodiment is about an example in which the relay apparatus 200 and the managing apparatus 300 are separate bodies, the relay apparatus 200 and the managing apparatus 300 are not limited thereto. The relay apparatus 200 and the managing apparatus 300 may be one body, and for example, the relay apparatus 200 may have functions of the managing apparatus 300.

In the explanation above, each unit of each apparatus or terminal among the information providing apparatus 100, the relay apparatus 200, the managing apparatus 300 and the communication terminals 400 may be realized by hardware or realized by software. Also, they may be realized by combinations of hardware and software. Also, execution of a program may cause a computer to function as any of the information providing apparatus 100, the relay apparatus 200, the managing apparatus 300 and the communication terminals 400. The program may be installed, from a computer-readable medium or a storage connected to a network, in the computer that constitutes at least part of any of the information providing apparatus 100, the relay apparatus 200, the managing apparatus 300 and the communication terminals 400.

The programs that are installed in the computer and cause the computer to function as any of the information providing apparatus 100, the relay apparatus 200, the managing apparatus 300 and the communication terminals 400 according to the present embodiment may act on a CPU or the like to respectively cause the computer to function as each unit of any of the information providing apparatus 100, the relay apparatus 200, the managing apparatus 300 and the communication terminals 400. Information processing described in these programs is read in by the computer to function as a specific means realized by cooperation between software and hardware resources of any of the information providing apparatus 100, the relay apparatus 200, the managing apparatus 300 and the communication terminals 400.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: network; 12: file server; 14: mail server; 16: web server; 20: router; 50: network; 100: information providing apparatus; 101: information providing service; 102: authentication information storing unit; 103: terminal authenticating unit; 104: relay apparatus checking unit; 105: communication connection establishing unit; 106: contents managing unit; 107: contents providing unit; 110: token authenticating unit; 112: key data request receiving unit; 114: key data generating unit; 116: authentication data generating unit; 118: encrypting unit; 120: authentication data storing unit; 122: key data transmitting unit; 124: authentication data transmitting unit; 126: key data receiving unit; 128: key authenticatability judging unit; 130: token transmitting unit; 132: ID receiving unit; 134: authenticatability judging unit; 136: communication connection establishing unit; 138: terminal group registering unit; 150: provider information processing unit; 152: generation instruction receiving unit; 154: provider information acquiring unit; 156: registration information generating unit; 158: registration information storing unit; 160: designation information receiving unit; 162: provider information transmitting unit; 164: inquiry output unit; 166: inquiry response receiving unit; 170: copied data processing unit; 172: copied data receiving unit; 174: copied data storing unit; 176: paste request receiving unit; 178: data judging unit; 180: data transmitting unit; 182: copy notifying information receiving unit; 184: link information storing unit; 186: link information judging unit; 188: link information transmitting unit; 190: download request receiving unit; 192: data acquiring unit; 194: history storing unit; 196: history transmitting unit; 198: designation receiving unit; 200: relay apparatus; 210: copied data processing unit; 212: copied data receiving unit; 214: copied data storing unit; 216: paste request receiving unit; 218: data judging unit; 220: data transmitting unit; 300: managing apparatus; 302: authentication data receiving unit; 304: authentication data storing unit; 306: terminal request receiving unit; 308: key acquisition instruction transmitting unit; 310: key data receiving unit; 312: key authenticatability judging unit; 314: key data transmitting unit; 316: token receiving unit; 318: ID transmitting unit; 400: communication terminal; 402: communication terminal; 404: communication terminal; 406: communication terminal; 412: communicating unit; 414: data storing unit; 416: display unit; 418: operation unit; 420: data icon; 430: menu; 440: menu; 500: provider registration information table; 502: main terminal field; 504: group terminal field; 506: name field; 508: provider information field

What is claimed is:

1. A method for enabling an unlogged in communication terminal to be logged into a closed network, comprising:
   authenticating each of a sub-plurality of a plurality of communication terminals in communication with the closed network via a router, based on a single user ID, each of the plurality of communication terminals being outside of the closed network;
   maintaining the sub-plurality of the plurality of communication terminals logged into an information providing service in communication with the closed network;
   receiving by at least one of the sub-plurality of communication terminals, from at least any one unlogged in one of the plurality of communication terminals, an instruction to generate provider registration information including a plurality of pieces of provider information that indicate a provider of respective pieces of data being displayed on each of the sub-plurality of communication terminals;
   acquiring, upon reception of the instruction to generate the provider registration information, the plurality of pieces of provider information that indicate the respective provider within the closed network of the data being displayed on each of the sub-plurality of communication terminals outside the closed network; and
   associating terminal identification information of each of the plurality of communication terminals with each of the plurality of pieces of provider information;
   receiving by the at least one of the sub-plurality of communication terminals, from the at least one unlogged in one of the plurality of communication terminals, designation information that designates the provider registration information;
   transmitting each of the plurality of pieces of provider information to each of the plurality of communication terminals so as to cause each of the plurality of communication terminals outside of the closed network to display the data provided by the respective provider within the closed network indicated by the plurality of pieces of provider information included in the provider registration information, when the designation information has been received and when all of the plurality of communication terminals identified by the plurality of pieces of terminal identification information associated with the plurality of pieces of provider information included in the provider registration information are logged into the information providing service; and
   transmitting, to only the sub-plurality of communication terminals that are logged in to the closed network, data that indicates the provider information corresponding to the terminal identification information of the at least one unlogged in one of the plurality of communication terminals that is not logged into the information providing service, when the designation information has been received and when the at least one unlogged in one of the plurality of communication terminals is not logged in.

2. The communication system according to claim 1, wherein the data that indicates the provider information is displayed with an icon that indicates provider information.

3. A non-transitory computer readable storage medium storing thereon a program that causes a computer to function to:
   authenticate each of a sub-plurality of a plurality of communication terminals in communication with the closed network via a router, based on a single user ID, each of the plurality of communication terminals being outside of the closed network;
   maintain the sub-plurality of the plurality of communication terminals logged into an information providing service in communication with the closed network;
   receive by at least one of the sub-plurality of communication terminals, from at least any one unlogged in one of the plurality of communication terminals, an instruction to generate provider registration information including a plurality of pieces of provider information that indicate a provider of respective pieces of data being displayed on each of the sub-plurality of communication terminals;
   acquire, upon reception of the instruction to generate the provider registration information, the plurality of pieces of provider information that indicate the respective provider within the closed network of the data being displayed on each of the sub-plurality of communication terminals outside the closed network; and
   associate terminal identification information of each of the plurality of communication terminals with each of the a plurality of pieces of provider information;
   receive by the at least one of the sub-plurality of communication terminals, from the at least one unlogged in one of the plurality of communication terminals, designation information that designates the provider registration information;
   transmit each of the plurality of pieces of provider information to each of the plurality of communication terminals so as to cause each of the plurality of communication terminals outside of the closed network to display the data provided by the respective provider within the closed network indicated by the plurality of pieces of provider information included in the provider registration information, when the designation information has been received and when all of the plurality of communication terminals identified by the plurality of pieces of terminal identification information associated with the plurality of pieces of provider information included in the provider registration information are logged into the information providing service; and transmit, to only the sub-plurality of communication terminals that are logged into the closed network, data that indicates the provider information corresponding to the terminal identification information of the at least one unlogged in one of the plurality of communication terminals that is not logged into the information providing service, when the designation information has been received and when the at least one unlogged in one of the plurality of communication terminals is not logged in.

4. The computer readable storage medium according to claim 3, wherein the data that indicates the provider information is displayed with an icon that indicates provider information.

* * * * *